Nov. 23, 1965 F. ZANKL ETAL 3,218,706
MACHINE TOOL WITH TOOL CHANGER
Filed Aug. 30, 1962 10 Sheets-Sheet 1

INVENTORS
Frank Zankl
BY Earl R. Lohneis
William C. Gleisner Jr.
Attorney

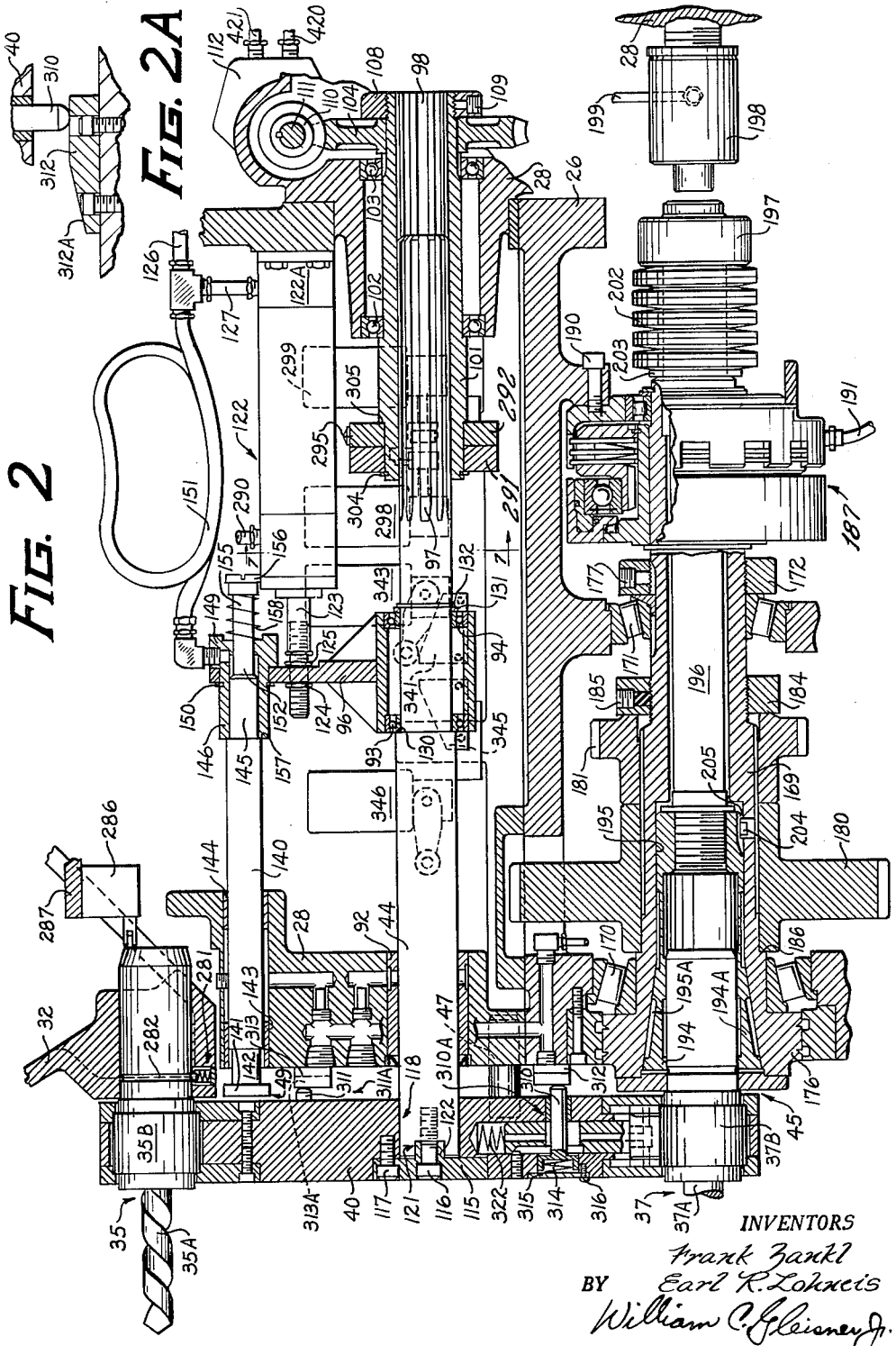

Nov. 23, 1965    F. ZANKL ETAL    3,218,706
MACHINE TOOL WITH TOOL CHANGER
Filed Aug. 30, 1962    10 Sheets-Sheet 3
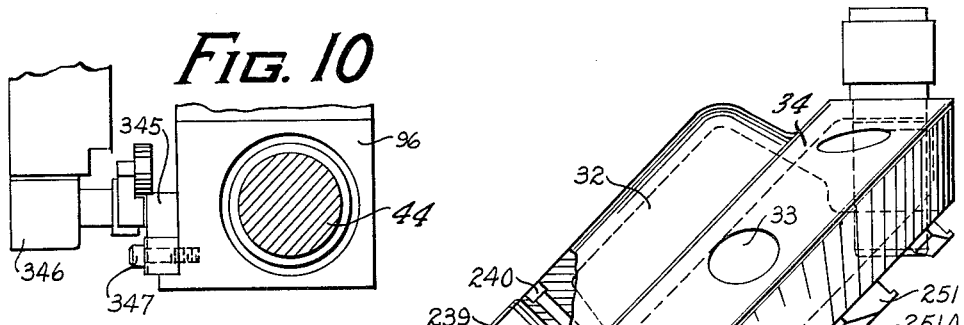
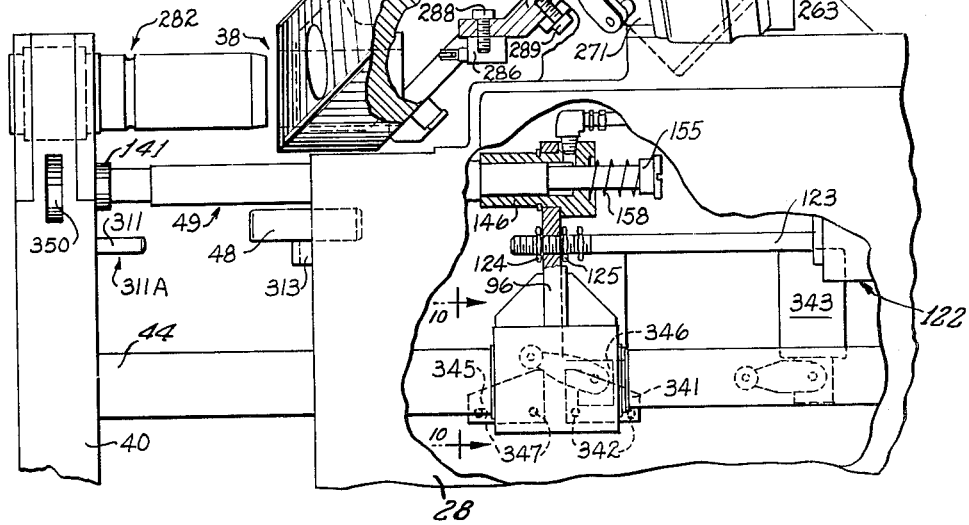
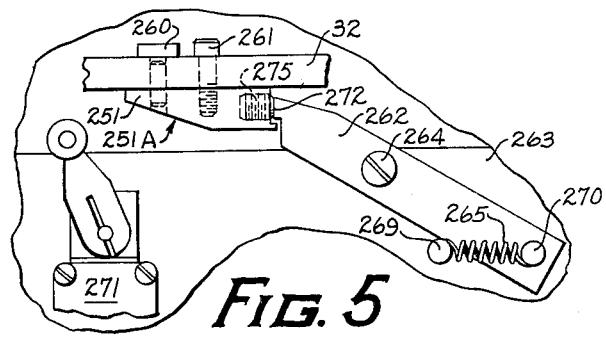
INVENTORS
Frank Zankl
Earl R. Lohneis
BY
William C. Gleisner Jr.
Attorney

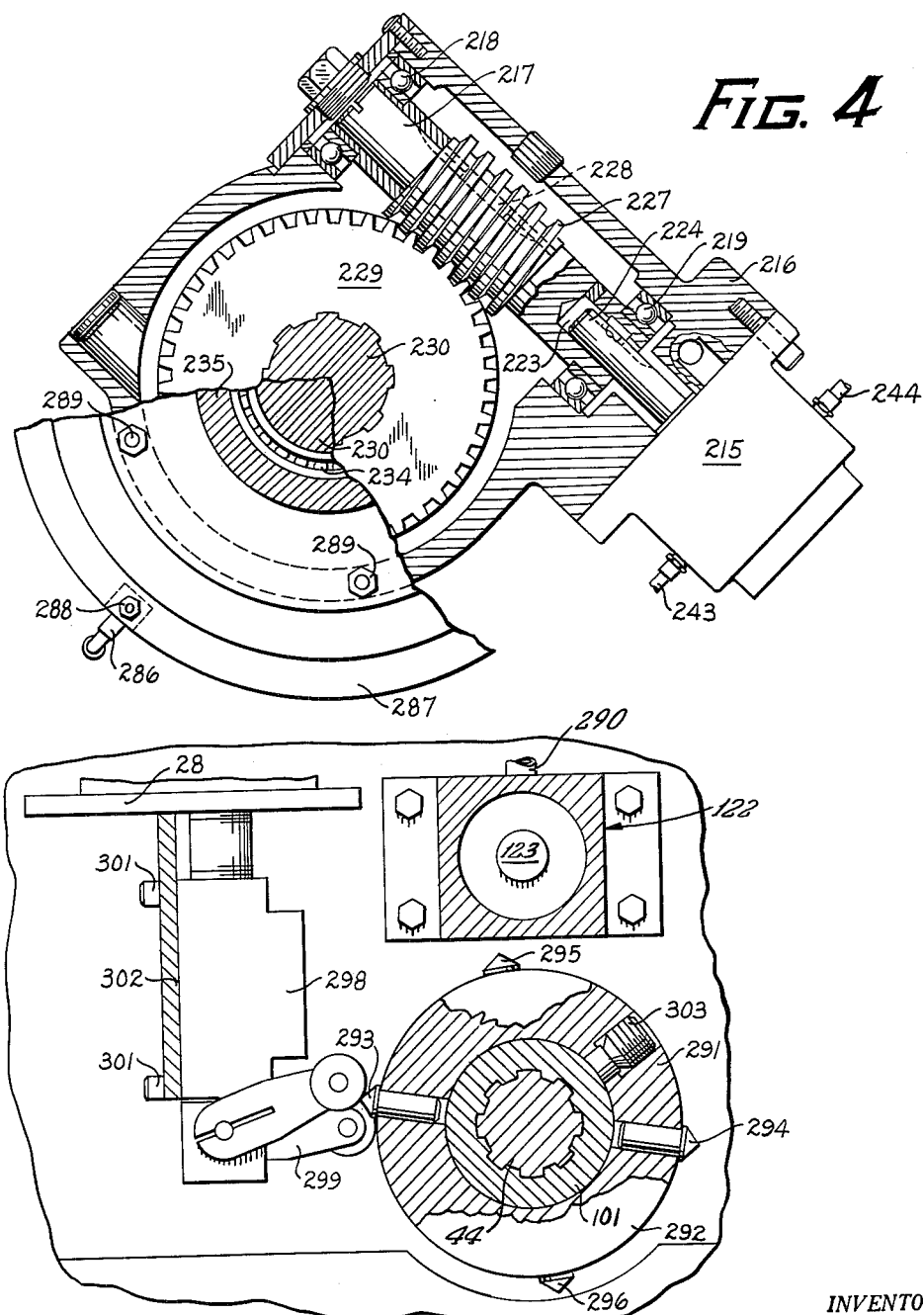

Nov. 23, 1965  F. ZANKL ETAL  3,218,706
MACHINE TOOL WITH TOOL CHANGER
Filed Aug. 30, 1962  10 Sheets-Sheet 5
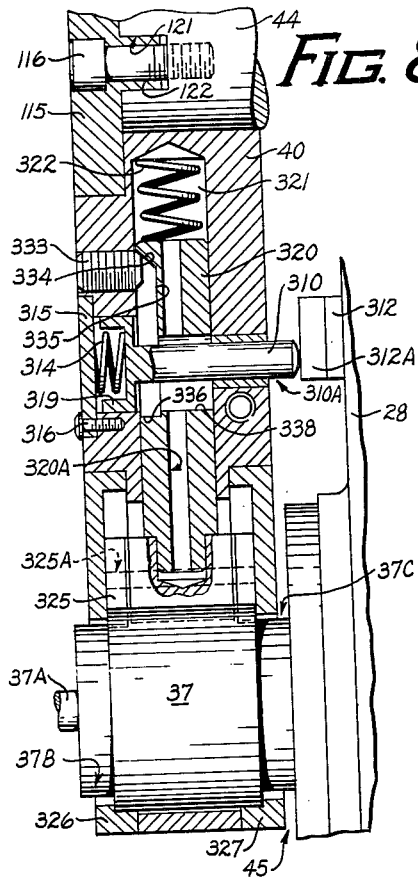
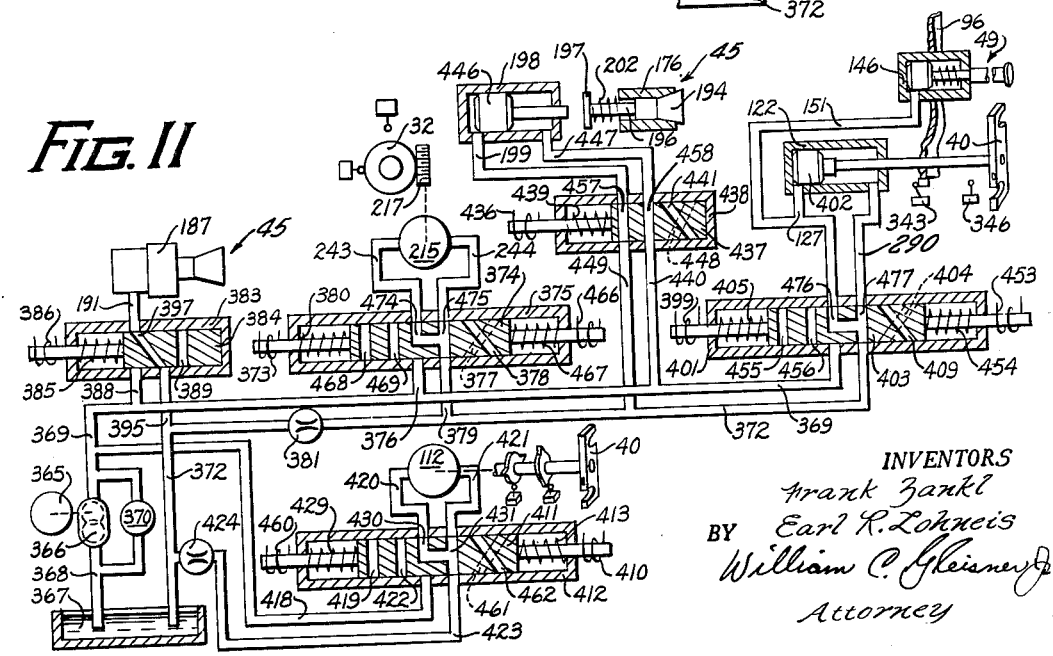
INVENTORS
Frank Zankl
Earl R. Lohneis
BY
William C. Gleisner Jr.
Attorney

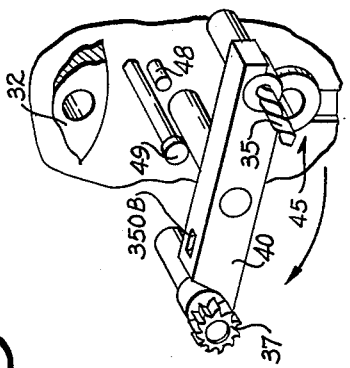
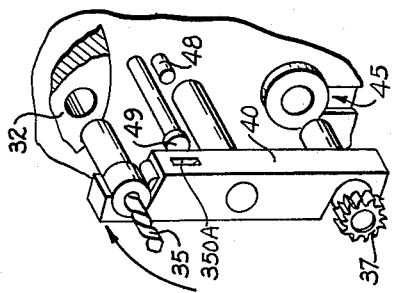
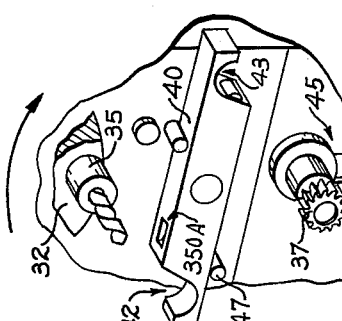
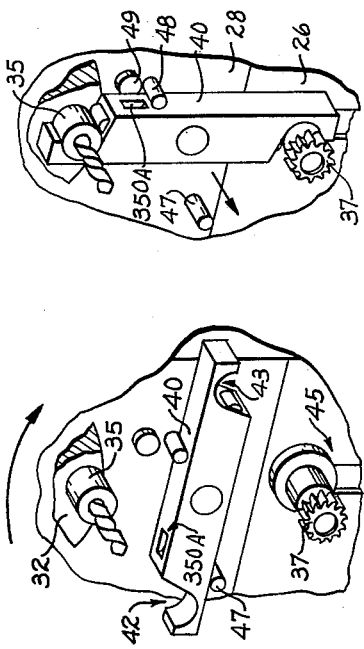
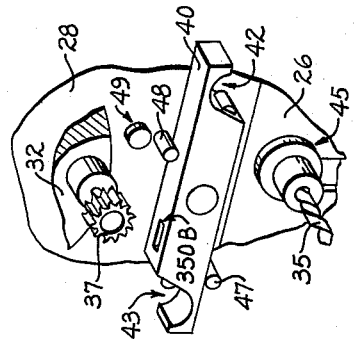
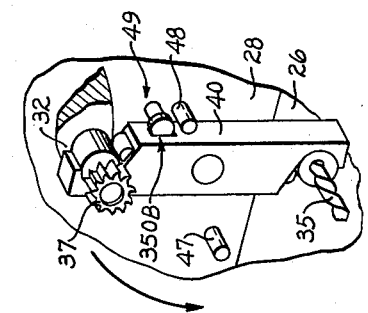
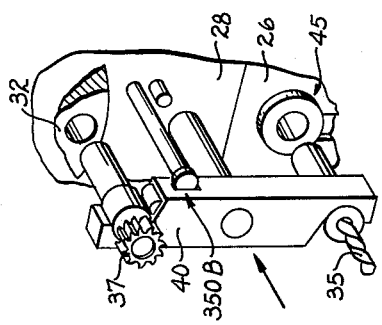
INVENTORS
Frank Zankl
Earl K. Lohneis
BY William C. Gleimer Jr.
Attorney

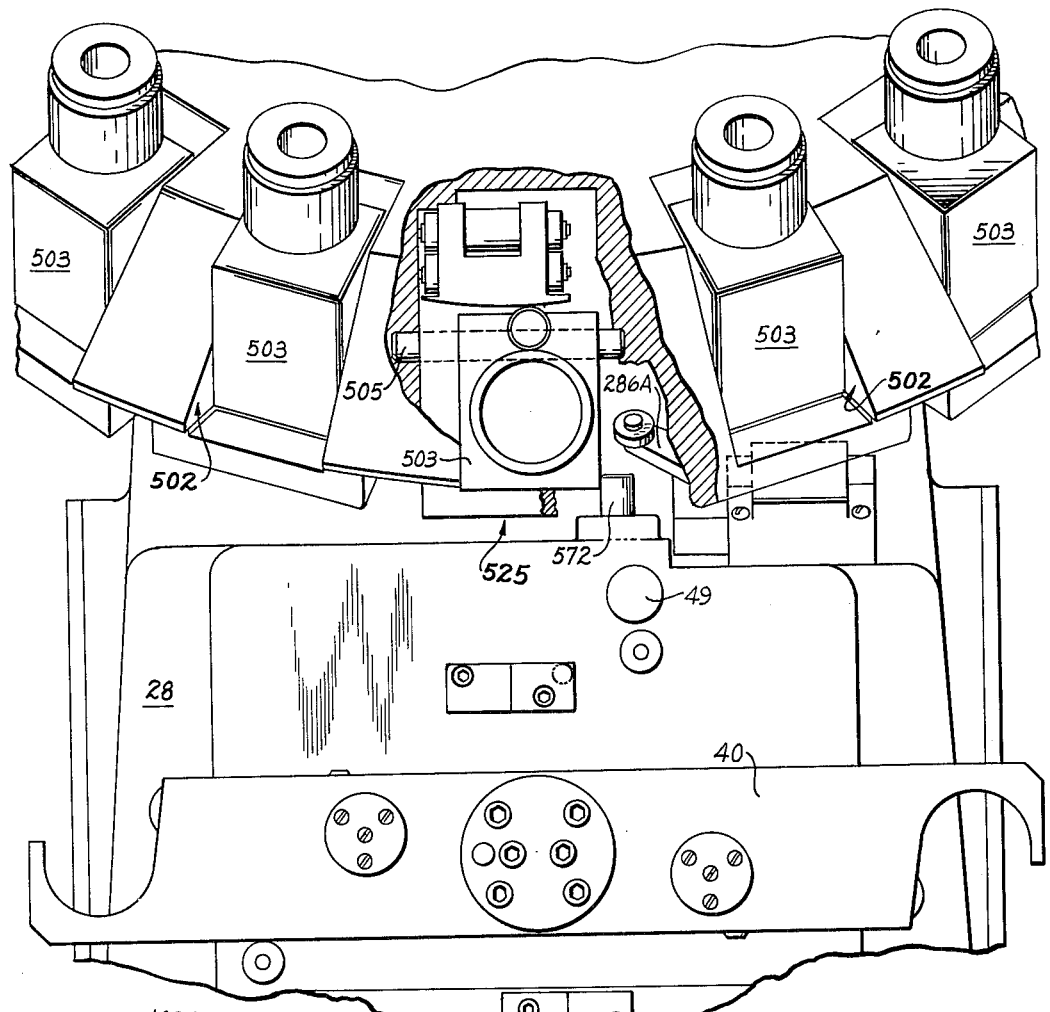
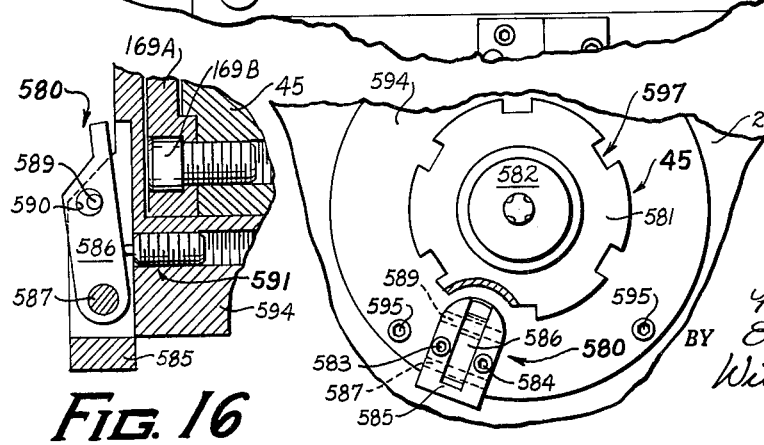

Nov. 23, 1965    F. ZANKL ETAL    3,218,706
MACHINE TOOL WITH TOOL CHANGER
Filed Aug. 30, 1962    10 Sheets-Sheet 8

INVENTORS
Frank Zankl
Earl R. Lohneis
BY
William C. Gleisner Jr.
Attorney

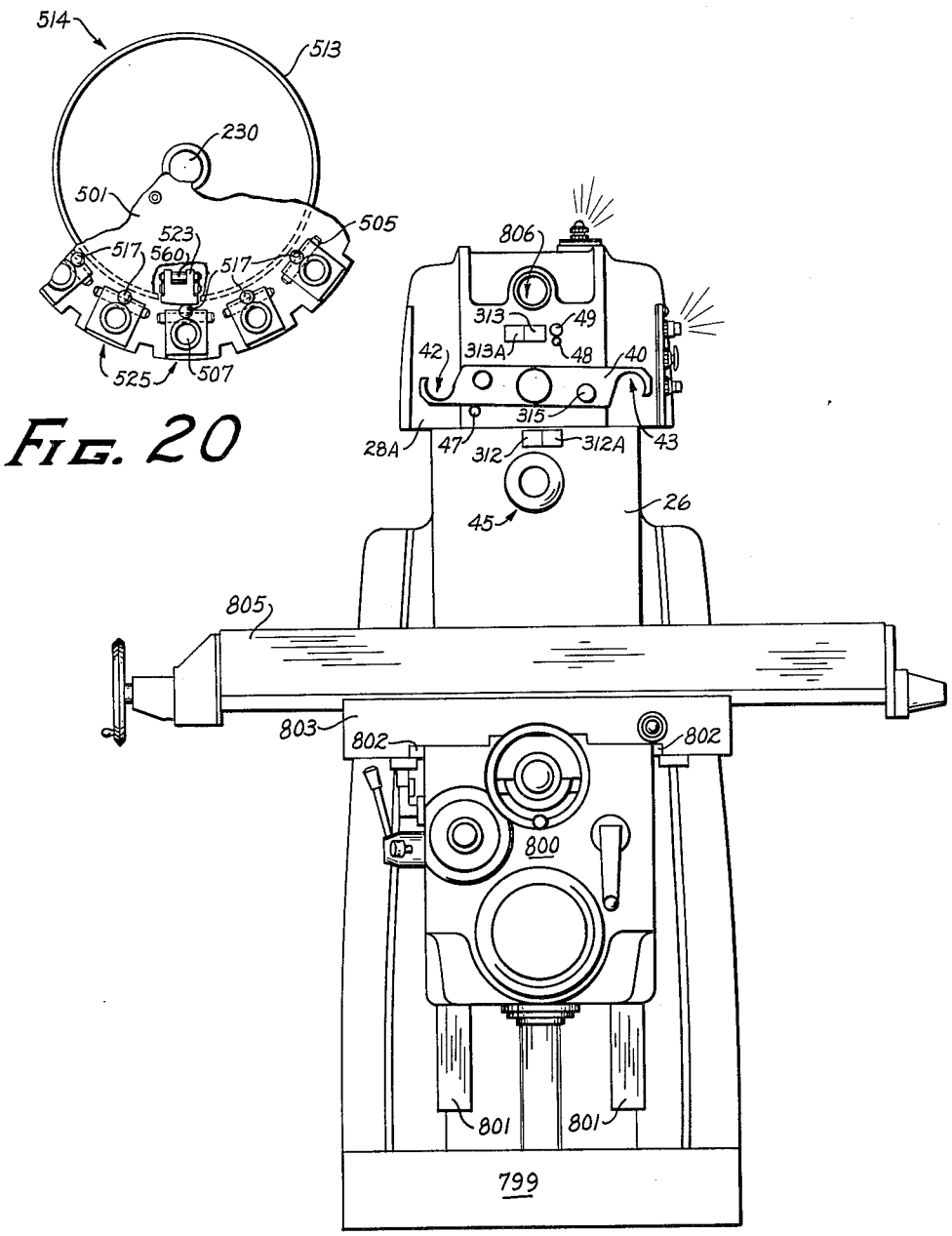

United States Patent Office 3,218,706
Patented Nov. 23, 1965

3,218,706
MACHINE TOOL WITH TOOL CHANGER
Frank Zankl and Earl R. Lohneis, Milwaukee, Wis., assignors to Kearney & Trecker Corporation, West Allis, Wis., a corporation of Wisconsin
Filed Aug. 30, 1962, Ser. No. 220,413
23 Claims. (Cl. 29—568)

This invention relates generally to a tool change mechanism for a machine tool and more particularly to an improved tool changer having greatly simplified control means.

It is the general object of this invention to provide an improved tool changer for interchanging tools between a machine tool spindle and a tool storage means.

Another object of this invention is to provide a tool changer mechanism wherein tools are held relatively loosely during an interchange of tools.

Another object of this invention is to provide a tool change mechanism that bodily moves selectively in at least three different planes of movement.

Another object of this invention is to provide a tool changer mechanism having simplified mechanical stop means for defining rotary movement of the mechanism.

Another object of this invention is to provide a tool storage magazine with tools carried therein in a conically disposed array with respect to the axis of rotation of the magazine.

Another object of this invention is to provide a tool changer mechanism with a simplified mechanically operated lock for securing tools in the tool change mechanism during a tool changing cycle, and that is actuated as an incident to a tool changing movement.

Another object is to provide a simplified indexing control system for a tool storage member.

Another object is to provide a novel means for coding the first tool of a sequentially arranged group of tools carried by an indexable tool storage drum in such a manner that the starting point of the group can be readily identified.

Another object is to provide a unitary tool storage and tool changer mechanism adapted to be applied to a machine tool having a tool receiving spindle.

Another object is to provide an improved tool changer adapted for use with one of a plurality of different types of tool storage means.

Another object of the invention is to provide a machine tool incorporating improved tool storage and tool change means requiring a minimum of coacting parts, and with a minimum of control movements required to effect a tool interchange.

A further object of this invention is to provide a tool change mechanism that progressively rotates more than 360° in two successive cycles of tool interchanging.

A further object of this invention is to provide an improved tool change mechanism.

A still further object of this invention is to provide a bodily movable stop member for limiting rotary movement of a tool changer mechanism, and for accurately locating the tool changer mechanism in a properly aligned position for inserting tools into a spindle and a storage socket respectively.

A still further object of this invention is to provide a tool storage magazine with a plurality of novel tilting tool supports for carrying tools.

A still further object of this invention is to provide an improved novel linkage mechanism for tilting a tool support from an indexing position to a tool change station.

A still further object of this invention is to provide a tool storage magazine with a plurality of tilting tool supports carried in a manner that each tool support is moved into abutting engagement with a fixed stop when in the tool change station.

A still further object of this invention is to provide a tool storage drum with a plurality of tilting tool supports that engage a stationary guide track during indexing movement.

According to this invention, there is provided an improved machine tool having a frame and a rotatably mounted spindle with an indexable tool storage magazine and a cooperating tool change mechanism. The tool storage magazine is indexably mounted on the upper portion of the machine while the tool change mechanism is carried in bodily spaced relationship relative to the spindle and the storage magazine. The tool change mechanism is operative to effect an interchange of tools between the storage magazine and the spindle upon a predetermined signal supplied manually or by automatic program control means.

The tool storage magazine is mounted in an inclined plane on the upper portion of the frame and is provided with a plurality of peripherally spaced bored openings conical to the drum axis, and respectively disposed to releasably support a plurality of tools. With the drum rotatably carried in an inclined plane, and with the bored openings as well as the tools disposed conically to the axis of drum rotation; the longitudinal axis of each bored opening is arranged to be parallel with the longitudinal axis of the spindle when the tool carried by the respective bored opening is in the tool change station. Since the storage magazine rotates in an inclined plane, the longitudinal axis of the other tools carried conically in the magazine periphery are disposed at an angle relative to the longitudinal axis of the spindle, since they are not in the tool change station. However, as each tool is moved into the tool change station, its longitudinal axis is then parallel to the longitudinal axis of the spindle.

In a modification of the tool storage magazine above there is provided a tool storage magazine of the same diameter as the embodiment providing a conical array of tools, but having a greater tool carrying capacity. To do this in a magazine of approximately the same diameter, the tools are carried in tilting tool support mounted for selective outward tilting movement in closely spaced radial guide slots formed in the periphery of the drum. The greater tool carrying capacity is due to the fact that in the principal embodiment of FIG. 1 the tools in the circular alignment of tools have to be sufficiently spaced to clear the arcuate swing of the tool change arm in gripping the selected tool, whereas, in the modification of FIG. 13, the selected tool to be gripped is swung out of the circular alignment and, thus, the closer spacing of adjacent tools does not interfere with the operation of the tool change mechanism. The modified magazine is rotatably mounted in an inclined plane on the frame of the machine, with the respective tilting tool supports normally retained in an index position in which the longitudinal axis of each tool support is parallel to the axis of rotation of the magazine. The tool supports together with the tools are guided and maintained in the index position by means of a guide track mounted concentrically with the axis of rotation of the magazine.

In the modification of the tool storage magazine, the mounting provided therefor is identical with that provided for the principal embodiment. Therefore, both types of tool storage magazines are interchangeable with the machine tool providing a greater degree of flexibility in manufacture.

To remove a tool from any of the tilting tool supports the magazine is indexed until the selected tool is adjacent the tool change station. A power actuator connected to a ovable section of the guide track is then actuated tilting
tool support as well as the tool into the tool change
sition. In the tool change position, the longitudinal
is of the tool is parallel with the longitudinal axis of
spindle.

Tools are interchanged between the storage magazine
d the spindle by means of the tool change mechanism.
e tool change mechanism includes a carrier that is
dily carried for axial as well as rotatable movement
effecting the tool interchange. The carrier is pro-
led with recesses at its opposite ends for simultaneously
pping a tool in the tool change station and in the
ndle during a tool change cycle. To secure each tool
the respective recess during rotary movement of the
rier, each recess is provided with a lock operated as
incident to effecting a tool interchange.

In a typical machining cycle, the tools are first placed
the tool storage magazine in sequential order of their
. To identify the first tool in the machining cycle, it is
ovided with a code identified tool holder to facilitate
led identification of a sequentially disposed group of
ls.

A tool change cycle is initiated by indexing the maga-
e until the first tool in the machining cycle is identified
l positioned in the tool change station for subsequent
nsfer to the spindle. The tool change mechanism then
ects the interchange of tools between the magazine and
spindle. Upon completion of the machining opera-
n with the first tool, the tool is returned to the storage
gazine and the second tool is simultaneously trans-
red from the magazine to the spindle. It will be ap-
ent that with the tools carried in sequential order of
ir use, each subsequent tool used in the machining
le is moved to the tool change position with only one
gle step indexing movement of the magazine.

The foregoing and other objects of this invention, which
l become more fully apparent from the following
ailed description, may be achieved by the exemplify-
apparatus depicted and set forth in the specification
connection with the accompanying drawings, in which:

FIG. 2 is an enlarged fragmentary view in transverse
tical section through the upper portion of the machine
l illustrating primarily the tool change mechanism and
spindle;

FIG. 2A is a fragmentary view of an actuating plunger
ociated with a tool lock shown in engagement with a
ionary bevel cam;

FIG. 3 is a fragmentary view, partly in vertical section
l partly in side elevation, and with certain parts broken
y to illustrate the storage magazine and the tool
nge mechanism shown in extended position for with-
wing tools;

FIG. 4 is a fragmentary view illustrating the magazine
e mechanism;

FIG. 5 is an enlarged fragmentary view of the spring
ed positioning latch and one of the positive stop dogs
locating the tool storage drum in a selected index
ition;

FIG. 6 is a fragmentary view of tool holders illustrating
difference in length of tool holder bodies to provide
mple coded identification for the first tool in a machine
le relative to the other tools;

FIG. 7 is a fragmentary view in longitudinal vertical
ion taken generally along the lines 7—7 in FIG. 2;

FIG. 8 is an enlarged fragmentary view, partly in ver-
l section and partly in elevation illustrating in detail
mechanism for gripping and locking a tool in the tool
nge mechanism;

FIG. 9 is an enlarged fragmentary view, in front eleva-
, of one tool holding recess and showing in detail the
ner of constraining a tool for slight radial centering
ement;

FIG. 10 is a view along section lines 10—10 in FIG. 3
showing the relative position of one limit switch and one
stop dog operative to control axial movement of the tool
changer;

FIG. 11 is a schematic view of the hydraulic control
circuit incorporated in the machine;

Figure 14:
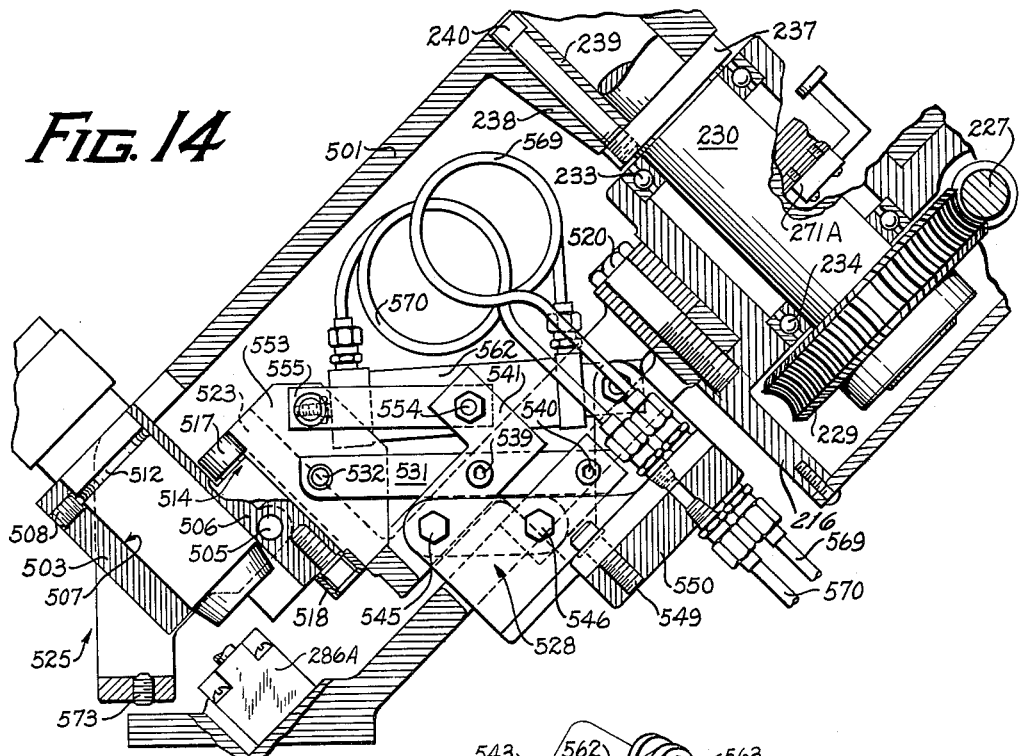
Figure 15:
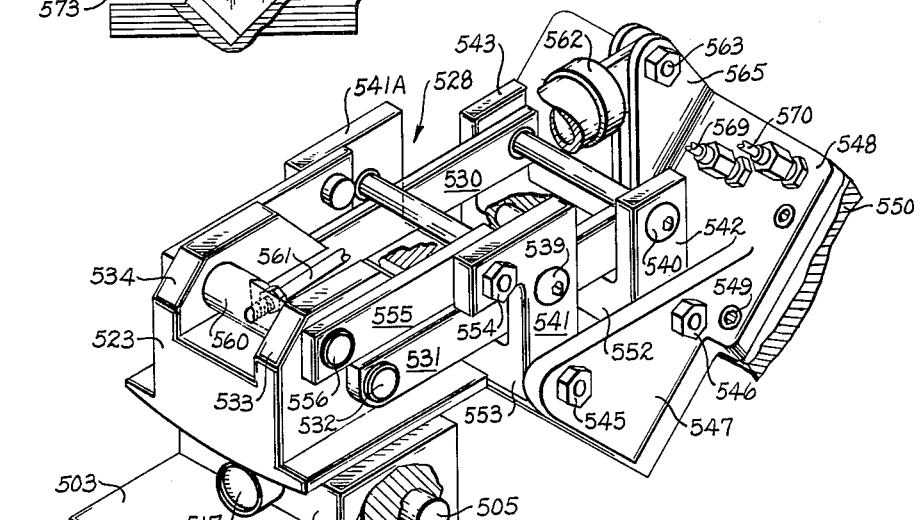
Figure 18:
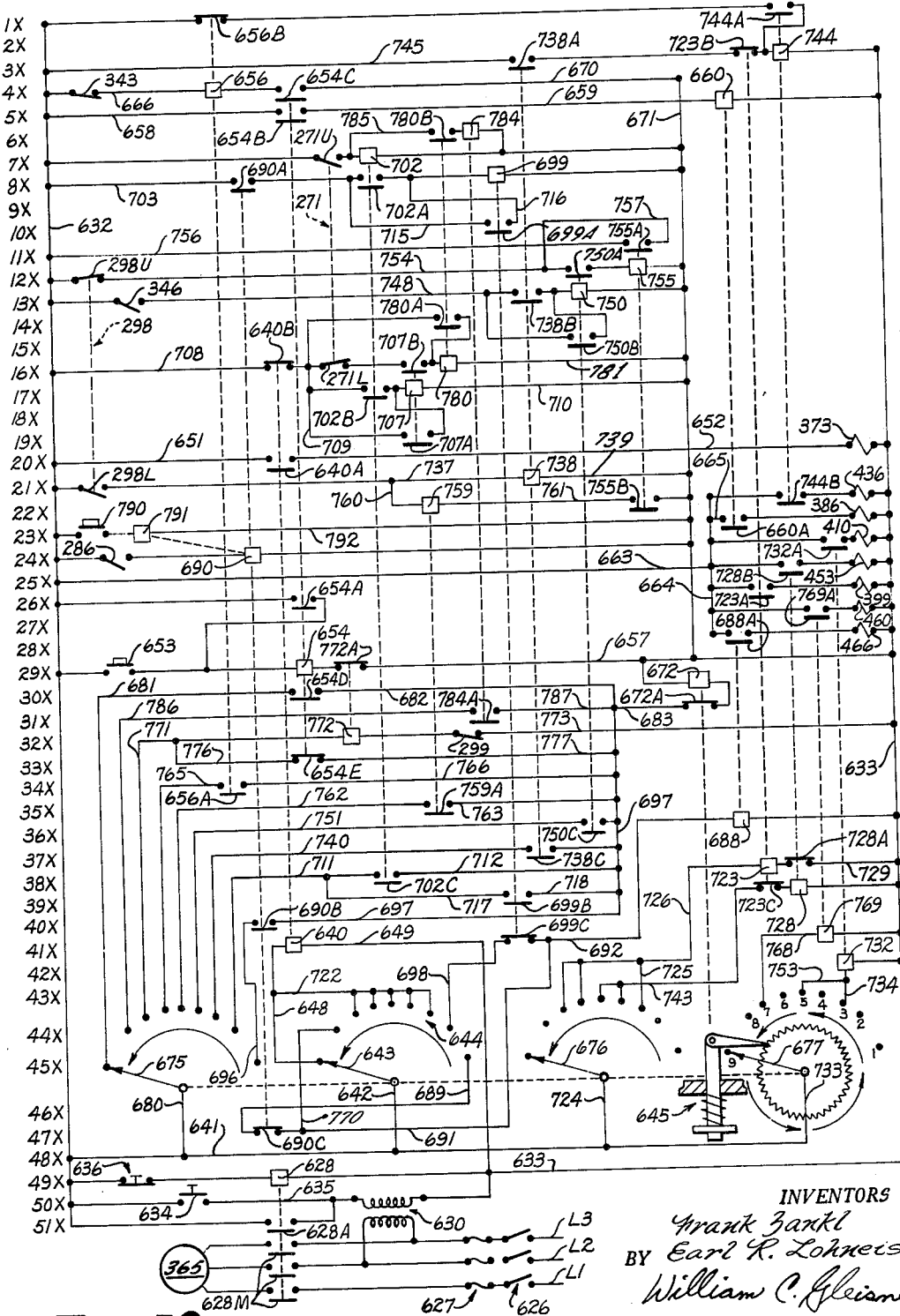

FIGS. 12 to 12F inclusive are diagrammatic views
respectively indicating different movements through which
the tool changer passes during one complete tool change
cycle;

FIG. 13 is a fragmentary view of a modified form of
tool storage drum illustrating tilting tool supports, and
shown partly in front elevation and partly in section;

FIG. 14 is a view in transverse vertical section illus-
trating the linkage mechanism for controlling selective
radial outward positioning movement of a tool support
from its retracted, indexing position;

FIG. 15 is a perspective view showing in greater detail
the linkage mechanism for tilting tool supports;

FIG. 16 is an enlarged fragmentary view showing in
detail a spring biased lock mechanism especially adapted
to control reversing movement of tapping tools;

FIG. 16A is a fragmentary view in front elevation of
the machine, showing a self-reversing tapping tool holder
in position to be engaged by the control lock mechanism
of FIG. 16;

FIG. 17 is a partial view of the hydraulic circuit of
FIG. 11 illustrating a modified hydraulic circuit incorpo-
rated in the modification of the invention as shown in
FIGS. 13, 14 and 15;

FIG. 18 is a diagrammatic view of the electrical cir-
cuit incorporated in the machine;

FIG. 19 is a view in front elevation of a machine tool
incorporating modified tool storage means; and, FIG. 20 is a fragmentary schematic plan view of the
modified form of the invention shown in FIG. 13, as
viewed along the angular axis of the tool storage drum.

Figure 1:
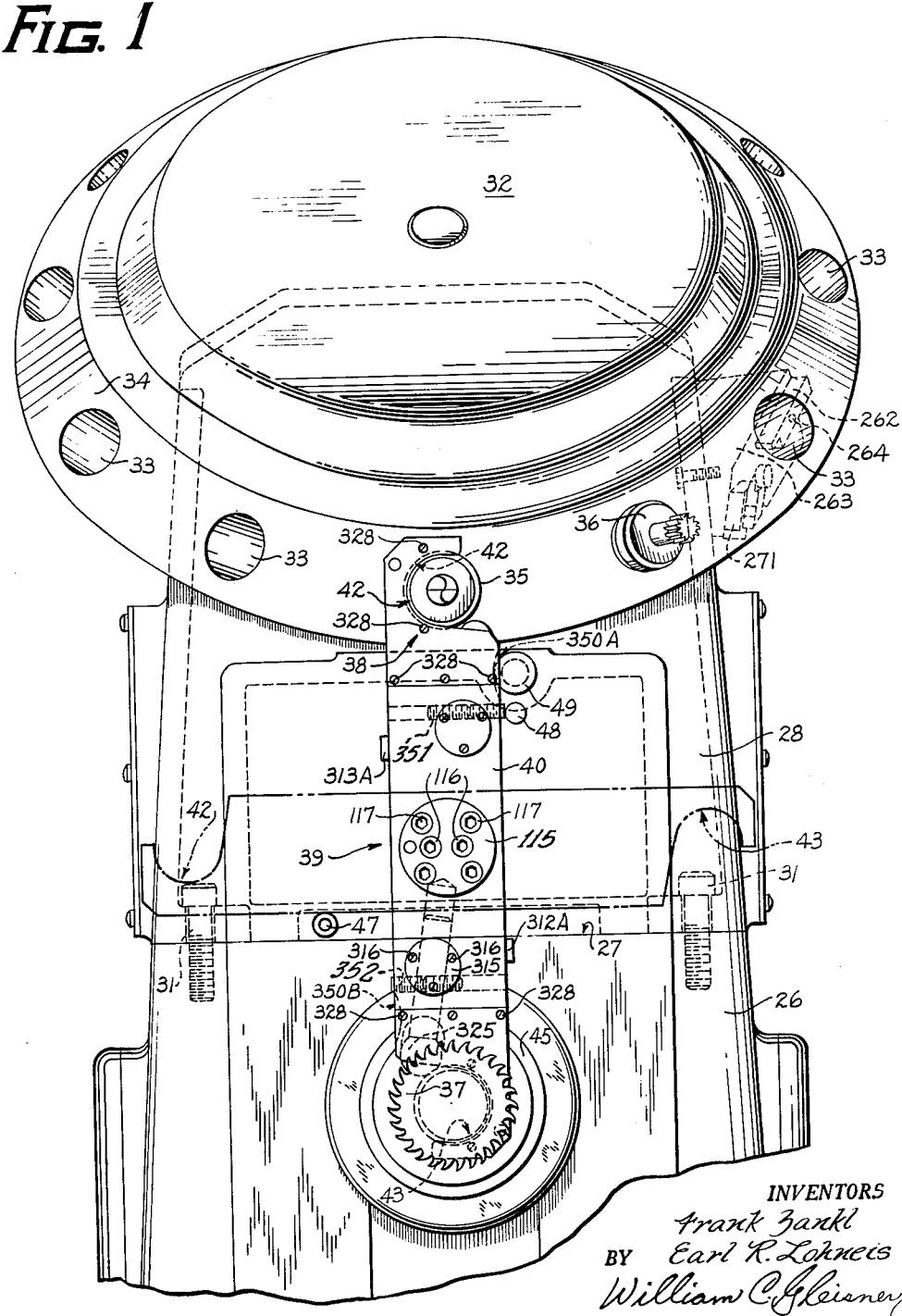
FIGURE 1 is a view in front elevation of the upper
tion of a machine tool with the unitary tool storage
l tool changer mechanism.

Reference is now made to the drawings and more spe-
cifically to FIG. 1 thereof illustrating a machine tool
incorporating the various features of the present inven-
tion. As there shown, the machine generally comprises
a base (not shown) having a vertical column 26 present-
ing an upper flat surface 27. As clearly illustrated in
FIG. 19, the column 26 is provided with a forwardly
projecting base 799, above which is supported a vertically
movable knee 800 that is slidably secured to vertical
guideways 801 on the column 26. Transverse guideways
802 on the upper surface of the knee 800 slidably support
a transversely movable saddle 803 upon which is slidably
carried a longitudinally movable work supporting table
805. Power operable means (not shown) are connected
in well-known manner to effect selective relative move-
ment of the knee 800, saddle 803 and table 805 along
three mutually perpendicular axes. Thus, a workpiece
(not shown) may be secured to the table 805 for selec-
tive movement relative to the cutting tool 37 operatively
secured within the tool receiving spindle 45.

A frame 28 having a complementary flat surface abut-
ting the surface 27 is secured to the column 26 by means
of threaded bolts 31. The frame 28 rotatably supports
a tool storage magazine or drum 32 on the upper por-
tion thereof in an inclined plane, as shown in FIGS. 1
and 3. The storage magazine is provided with a beveled
periphery 34 having a plurality of peripherally spaced
bored openings 33 formed therein and constituting stor-
age sockets or tool supports for carrying tools, such as
tools 35, 36 and 37 as illustrated in FIG. 1 which are
selectively moved into a tool change or ready station
generally identified by the reference numeral 38. Each
bored opening 33 or tool socket is formed in the periph-
ery at a predetermined angle such that the longitudinal
axis of the bored opening intersects the axis of rotation
of the magazine 32. Thus, viewed collectively, both the
bored openings as well as the tools carried therein are
disposed conically with respect to the axis of drum rotation. The angle of the bored openings 33 with respect to the axis of drum rotation is such that when a tool carried in the bored opening is in the tool change station the longitudinal axis of the tool is parallel with the longitudinal axis of the spindle. Thus, a tool will be properly positioned when in the tool change station irrespective of its radially angular position when not in the tool change station.

In addition to the magazine 32, the frame 28 also carries for relative bodily movement a tool change mechanism or tool transfer device that is generally identified by numeral 39. The tool change mechanism 39 comprises essentially a carrier or tool change arm 40 presenting semi-circular tool gripping recesses 42, 43 at its opposite ends, and which is secured to the outer end of a shaft 44 in bodily spaced relationship relative to the storage magazine 32 and a tool receiving spindle 45 rotatably mounted in the column 26. The spindle 45 is rotatably driven by power means (not shown) and releasably carries a tool, such as the tool 37 as shown in FIG. 1. Below the tool spindle 45, the column 26 is disposed to carry a plurality of slidably superimposed work supporting members (not shown). To selectively limit certain rotary movements of the tool carrier 40, a pair of fixed stops 47, 48 are secured to the frame 28 and an axially movable stop 49 is operably carried by the frame. With coordinated movements of the magazine 32, tool carrier 40 and stop 49 and with the aid of fixed stops 47 and 48, tools are automatically interchanged between the storage magazine and the tool spindle 45.

The mounting of the carrier 40, the spindle 45, and the movable stop 49 in the frame 28 is best shown in FIG. 2. The carrier 40 is secured to the outer end of the shaft 44, the latter having its left central portion carried in a bushing 92 mounted in the frame 28 and its rightward end provided with external splines 97 having cooperatively sliding engagement with internal splines 98 formed in a rotatable drive sleeve 101. Toward its flanged central portion, the shaft is provided with bearings 93 and 94 that constitute a rotatable connection to an axially movable mounting block 96. The drive sleeve 101 is rotatably carried in a pair of bearings 102, 103 mounted in the frame 28 and is driven by a worm gear 104 splined to the rightward end of the sleeve. The worm gear 104 is secured to the splined end of the drive sleeve 101 by means of a nut 108 threaded on the end of the sleeve, and locked thereon by a set screw 109. The worm gear 104 is rotatably driven by a worm 110 having meshing engagement with the gear 104 and keyed to a shaft 111 of a hydraulic motor 112.

The left or outer end of the shaft 44 is secured to the carrier 40 by means of a plate 115 and bolts 116 and 117, as shown in FIGS. 1 and 2, with the shaft end being inserted into a circular bored pilot opening 118 in the carrier. The shaft end is provided with a slot 121 to receive a cooperating shoulder 122 presented by the plate 115. The plate 115 in turn is secured to the carrier 40 by the bolts 117 to complete the driving connection to the carrier from the shaft.

Axial movement of the carrier 40 is effected by means of a hydraulic power actuator 122 comprising a cylinder 122A bolted to the frame 28 and a cooperating axially movable piston rod 123 which is secured to the block 96 with nuts 124, 125. To move the carrier 40 and associated shaft 44 axially outward, as viewed in FIG. 2, hydraulic pressure fluid is supplied to the power actuator 122 via lines 126, 127 effecting leftward movement of the piston rod 123 secured to the block 96 which is operably connected to effect axial movement of the shaft 44. As shown in FIG. 2 the shaft 44 is provided with a shoulder 130 which abuts the inner race of the bearing 93 for moving the shaft axially outward. To provide a connection for retracting the shaft 44 for moving it rightwardly or inwardly, a washer 131 abuts the inner race of the bearing 94 and is held in such engagement by a snap ring 132. It will be apparent that the rightward end of the shaft 44 is retained in driving engagement with the splined sleeve 101 during axial movement.

Simultaneously with the leftward or outward axial movement of the carrier 40 and shaft 44, the movable stop 49 is moved axially outward both with and relative to the shaft 44 and carrier 40. The movable stop comprises a shaft 140 presenting an integrally formed radial flange 141 and a groove 142 at its outer end, as shown in FIG. 2. The left central portion of the shaft 140 is slidably carried in a pair of bushings 143, 144 mounted in the frame 28. At its inner end, a piston 145, having reduced diameter, is integrally formed with the shaft 140 and slidably carried within a cylinder 146. The cylinder 146 is carried in a bored opening in the block 96 and is provided with a flange 149 that abuts one side of the block 96. A snap ring 150 abutting the opposite side of the block 96 secures the cylinder 146 within the bore against axial movement relative to the block. To move the piston 145 outwardly, the cylinder 146 is connected via a flexible line 151 to the line 126 to receive hydraulic pressure fluid simultaneously with the power actuator 122.

The movable stop shaft 140 is provided with a second integrally formed reduced diameter shaft portion 152 which extends from the piston 145 through a bore in an end wall of the cylinder 146. A shoulder screw 155 presenting a flange 156 threadedly engages the end of the shaft portion 152. To retain the shaft 140 in a retracted position with a shoulder 157 in abutting engagement with the cylinder 146 whenever the cylinder 146 is connected to drain, a spring 158 is provided with one end abutting the cylinder 146 and its opposite end abutting the flange 156. Thus, whenever hydraulic pressure fluid is connected to actuate the power actuator 122, pressure fluid also flows via line 151 to the cylinder 146 moving the piston 145 and shaft 140 outwardly until the flange 141 of the movable stop 49 abuts an inner face of the carrier 40. After the carrier 40 is rotated out of engagement with the movable stop 49, the movable stop is urged outwardly until the shoulder screw 155 abuts the cylinder 146. With the movable stop fully extended, the carrier 40 will abuttingly engage it upon completion of 180° of rotary movement of the carrier in the extended position, as shown in FIG. 12D.

The tool spindle 45 is rotatably carried by the column 26 in bodily spaced relationship relative to the carrier 40 such that the axis of the spindle and the longitudinal axis of either recess 42, 43 coincide whenever the carrier is pivoted from its horizontal parked position to vertical tool engaging position as shown in FIGS. 1 and 2. The spindle 45 comprises essentially an elongated tubular shaft 169 rotatably supported in antifriction bearings 170, 171 which have their outer races mounted in the column 26. To secure the spindle 45 against axial movement within the bearings 170, 171, a lock nut 172 is threaded on the spindle to abut the inner race of the bearing 171 drawing a flange 176 integrally formed on the spindle shaft 169 into abutting engagement with the inner race of the bearing 170. The outer races of the bearings 170, 171 are provided with flanges which engage cooperatively formed flanges in the column to resist the axial force exerted by tightening the nut 172. A set screw 177 threaded radially into the nut 172 to engage the spindle shaft 169 to lock the nut 172 against rotation.

The spindle 45 is driven in well-known manner by a variable speed transmission mechanism (not shown) which is selectively connectable to either of spur gears 180, 181 which are splined to the spindle shaft 169. A nut 184 having a set screw 185, is threaded on the shaft 169 to properly secure the gears 180 and 181 to the spindle shaft in well known manner. At the rearward end of the spindle shaft 169, there is secured a hydraulically actuated spindle brake 187 having one portion secured to the shaft 169 and the cooperating portion secured to column 26 by means of bolts 190, one of which is shown in FIG. Hydraulic pressure fluid is supplied to the brake 187 via line 191, to actuate the brake to stop rotary movement of the spindle 45. Releasing hydraulic pressure from the line 191 will permit the spindle to be driven by the transmission upon selective engagement of a power driven in-clutch (not shown) operatively contained therein.

To facilitate an interchange of tools, the spindle 45 is provided with an automatic collet 194 constituting a selectively releasable tool clamping means. The collet 194 comprises an inner cylindrical hub guided for limited axial movement within an enlarged bored opening 195 formed in the spindle shaft 169. The hub of the collet 194 is integrally formed with a plurality of the usual outwardly extending, resiliently expansible gripping segments 194A. Consequently, whenever the collet is moved axially forward, the individual collet segments resiliently expand and to release a toolholder.

During rearward axial clamping movement of the collet, a tapered opening 195A in the spindle engages the complementary tapered periphery of the collet segments 194A, compressing them into tight clamping engagement with the shank of a toolholder, such as the toolholder 46 shown in FIG. 2. During axial movement in either direction, the collet is constrained against rotation by means of a keyway 205 formed in the cylindrical hub thereof engaging a key 204 secured to the spindle shaft 169. To effect axial movement in either direction, an axially movable control rod 196 extends through the bored opening in the spindle shaft 169 and is threadedly engaged at one end with the hub portion of the collet 194.

A thrust collar 197 secured to the inner end of the actuating rod 196 engages a Belleville spring 202, the opposite end of which abuts a thrust washer 203 engaging the inner end of the spindle shaft 169. Thus, with the spring 202 interposed between the spindle and the thrust collar 197, the rod 196 is continuously urged inwardly to maintain the collet 194 in an axially inward clamped position, as shown in FIG. 2.

For releasing the collet 194 prior to a tool interchange, a clamp release cylinder 198 secured to an inner wall of the frame 28 is provided with an extensible piston rod 40 which is axially aligned with the collet actuating rod 196. Admission of pressure fluid via a line 199 actuates the cylinder to effect axial outward movement of the actuating rod in opposition to the spring 202 and a corresponding outward movement of the spring collet 194 to unclamped position. At the completion of a tool interchange, the hydraulic line 199 is connected to exhaust, thereby deactivating the clamp release cylinder 198. Thereupon, the spring 202 again expands to urge the actuating rod 196 inwardly for moving the collet 194 axially inward to urge the segments thereof into positive clamping engagement with the next tool inserted therein.

To position a tool for an interchange with a tool carried by the spindle, the tool storage drum 32 is rotatably driven in a selected direction by a hydraulic motor 215, FIGS. 3 and 4, mounted on a transmission housing 216 secured to the frame 28. A shaft 217 rotatably carried by a pair of antifriction bearings 218 and 219 supported within the housing 216 is connected to a drive shaft 220 of the hydraulic motor 215. The drive shaft 220 is inserted into a cylindrical bore 223 formed in one end of the shaft 217 and a key 224 carried in opposed keyways respectively presented by the shafts 217 and 220 completes the driving connection. A worm 227 keyed to the shaft 217 by a key 228 meshingly engages a worm gear 229 splined to the splined extension of a storage drum drive shaft 230. Shaft 230 is rotatably journalled in a pair of antifriction bearings 233 and 234 supported within a bored opening formed in a projecting boss 235 of the transmission housing 216, as best shown in FIG. 3. The upper central portion of the shaft 230 is provided with a shoulder 236 which bears against the inner race of the bearing 233. Immediately adjacent the shoulder 236 the shaft 230 is provided with an integrally formed flange 237 which abuts a boss 238 of the drum 32 and with the upper end of the shaft 230 engaging a bore 239 formed in the boss 238. Peripherally spaced bolts 240, one of which is shown in FIG. 3, secure the drum 32 to the drive shaft flange 237. To rotatably drive the drum 32 in a clockwise direction as viewed in FIG. 1, pressure fluid is supplied to the motor 215 via line 243, FIG. 3, while a line 244 is simultaneously connected to drain. To drive the drum in a counterclockwise direction, pressure fluid is supplied to the motor 215 through the line 244 while the line 243 is connected to drain.

As shown in FIGS. 1 and 3, the drum 32 is indexed clockwise to position a preselected tool in a tool change station generally identified by the reference numeral 38. For the sake of clarity, it is emphasized that the tool change station is the final position in which a tool is held for subsequent pick-up by the carrier 40 and transfer to the spindle 45. With the drum 32 mounted on the frame 28 for rotation in an inclined plane, as best illustrated in FIG. 3, and with the tools carried in the bored openings 33 in a conical array relative to the axis of rotation of the drum 32, the arrangement is such that the longitudinal axis of a tool, positioned by the drum in the change station 38, is in a horizontal plane parallel with the longitudinal axis of the spindle. Conversely, when any tool is located exactly opposite the tool change station, the longitudinal axis of that particular tool is in a vertical plane perpendicular to the axis of the spindle. A tool located at any other position on the periphery of the drum 32 will have its longitudinal axis at an angle to both horizontal and vertical planes. Since the tool sockets are stationary in the drum it is emphasized that indexable movement of the drum operates to position a tool directly in the ready station in position for an immediate interchange. Obviously, other angular arrangements of tools in the drum that provide a conical array of tools can be utilized to provide the same result and are within the purview of this invention.

Selective indexable movement of the drum is controlled by apparatus best shown in FIGS. 2, 3 and 5 which includes tool positioning apparatus in addition to the hydraulic motor 215 and associated drive mechanism previously described. To selectively and accurately position each bored opening or tool support socket 33 in the tool change station 38, the drum 32 is provided with a plurality of peripherally spaced dogs 251, each of which is secured to the lower edge of the drum by means of a pair of bolts 260, 261, as shown in FIG. 5. Referring again to FIG. 3, the dogs 251 are carried in bodily spaced relationship to each other, and each dog is located in predetermined position relative to a respective one of the bored tool receiving openings 33. As the drum 32 is rotated in a clockwise direction, beveled faces 251A presented by the dogs 251 successively engage a spring biased lever 262 that is pivotably secured to a bracket 263 by a flanged pivot pin 264. The bracket 263 is secured to the transmission housing 216 in a manner to support the pivot lever 262 for pivoting movement relative to the rotatable storage drum. A spring 265 having one end attached to a pin 269 secured to the bracket 263 and its opposite end attached to a pin 270 secured to the lever 262 biases the lever 262 in a clockwise direction, as viewed in FIG. 5. In addition to functioning as an anchor for the spring 265, the pin 269 functions as a positive stop member for the lever 262 as it is urged clockwise about the pin 264.

As described hereinbefore, indexable rotation of the drum is normally in a clockwise direction according to the illustration in the present invention, as shown in FIG. 1, and with final positioning movement being in a limited counterclockwise direction. However, it is to be understood that this invention is not to be limited to clockwise indexing movement only, but can be arranged with minor modifications for normal counterclockwise indexing movement in which case, final limited positioning movement would then be effected in a clockwise direction.

Except when positioning the first tool of a group of tools, the clockwise indexing movement of the drum is sequential, with each index movement being incremental to position each succeeding tool of the group at the change station 38 in predetermined sequence. As the drum 32 is sequentially indexed one position in a clockiwse direction, FIG. 3, the beveled face 251A of one of the dogs 251 successively engage the lever 262 as well as a reverse control limit switch 271 secured to the bracket 263. The limit switch 271 is bodily spaced from the lever 262 in such a manner that the particular dog 251, which now controls an indexable movement, first trips the positive stop lever, and then continues a sufficient distance in a clockwise direction to permit the lever to return to its normal position before actuating the limit switch 271. With the electrical system properly conditioned, as will hereinafter be more fully described, actuation of the reverse control limit switch 271 effects final counterclockwise rotation of the drum 32 for advancing the corresponding tool into the tool change station 38. Counterclockwise rotation of the drum 32 effects movement of the perpendicular positioning face of the dog 251 last tripping the lever 262 into abutting engagement with a positioning end 272 of the lever 262, which is resiliently retained in its index stop position. To provide for accurate adjustable indexable positioning of the tools in the tool change station, the perpendicular positioning face of each dog 251 is provided with a set screw 275 for predeterminately effecting the proper spacing of the drum index positions as determined by the pivotable lever 262. Thus, it will be apparent that upon counterclockwise rotation of the drum, one end of a set screw 275 adjustably secured to the corresponding dog abuttingly engages the positioning end 272 of the trip lever 262, effecting final positioning of a tool in the drum 32 in the tool change station.

Each tool in the drum 32 actually comprises an operating tool and a tool holder. However, for the sake of simplicity and clarity, when reference is made to a tool it is to be understood to include the tool holder as well as the operating tool. Thus, in a typical machining cycle a tool carried by each of the bored openings or tool supports 33 in the drum 32 includes a tool holder as well. Each tool support or socket 33 is formed with an inwardly projecting boss 280 to slidably engage a tool and provide support therefor, as shown in FIG. 3. To retain any tool within a cooperating tool socket, a spring biased detent mechanism 281 of well known type is provided in each tool support. A spring biased ball of the detent mechanism projects radially inward into each socket to engage an annular groove 282 formed in the periphery of the tool holder, as illustrated in FIG. 2 to releasably hold the tool therein.

One of the novel features of this invention is the simplified index control system for the storage drum. The arrangement is such that, after the location of the first tool of a group of tools is identified, the drum is sequentially indexed to present the remaining tools of the group to the change station in the order required. To accomplish this, only the first tool of a group of tools required for machining a particular workpiece is provided with coded identifying means and inserted in any one of the tool receiving sockets. With the coded tool, such as the tool 35, FIG. 2, inserted in the drum the other tools of the group are manually inserted into the remaining empty sockets in the sequence of their required use, and in empty sockets extending in a counterclockwise direction with respect to the coded tool. After the required tools are loaded in the storage drum as described, it will be apparent that clockwise rotation of the drum will advance the respective tools to the tool change station 38 in the order of their required use. Thus, no coding is required on the drum itself to identify any of the storage sockets containing the preselected group of tools. Further, with one coded tool signalling the start of a predetermined, fixed sequence group of tools carried by the drum, no identifying coding is required for the remaining tools in a group, thus greatly simplifying initial tool preparation In addtion to simplifying tool preparation, the system affords an extremely high degree of flexibility in use with a minimum of coacting mechanical structure and associated control circuitry. A group of tools can comprise any number of tools within the total storage range of the machine, i.e. the total number of storage sockets available. The system is equally effective in the event a particular workpiece requires a number of tools considerably less than the total number of storage sockets available Assume, for example, that a workpiece requires a program of four series of machining operations, with four tools respectively presented in fixed sequence being necessary to effect those operations. In such a case, the four tools required would be manually loaded into the storage drum in four adjacent sockets in a predetermined fixed sequence extending in a counterclockwise direction, and with the first tool of the group being provided with code identifying means. At the completion of the four series of machining operations on the first workpiece, the four required tools would be returned to the storage drum sockets in the same sequential order in which they had been manually inserted. At this time, however, the fourth tool of the group of four tools would now occupy the tool change station.

Upon restarting the machine to operate upon the second workpiece, the storage drum would again be rotated in a clockwise direction to advance the coded first tool into the change station. During this starting period, the reverse control switch 271 is deactivated and has no effect on continuous rotation of the drum in a clockwise direction. Thus, although the beveled dogs respectively associated with the empty sockets between the fourth tool and the first tool successively trip the lever 262 and actuate the now deactivated reverse control limit switch 271 drum rotation will continue in a clockwise direction until the first code identified tool is moved into close proximity to the change station. As the first tool again approaches the ready station, the coding means associate therewith operates an associated switch means to reactivate the reverse control limit switch 271 and the interconnected sequential index control system. Thereupon, with slight additional clockwise movement of the drum being continuous, the beveled stop dog associate with the storage socket carrying the coded tool actuate the now reactivated reverse control switch 271. Such actuation of the activated reverse control switch initiate the final counterclockwise positioning movement of the drum for moving the coded tool into the ready station 38 Thereafter, the activated reverse control switch is operative to control the single step, indexable advancement of the storage drum for sequentially positioning the remaining tools of the group at the ready station as hereinbefore explained.

In a preferred embodiment of the invention, the first tool of a group of tools for a machine cycle is coded by providing the operating tool with a tool holder having a body of greater length than the tool holders for the remaining non-coded tools. The difference in length of tool holder is shown in FIG. 2 and in greater detail in FIG. 6, with respect to the tools 35 and 37. As best illustrated in FIG. 6, the tool 35 is the first tool in a machining cycle and, as such, is coded by being provided with a tool holder body having a greater length by an amount "A" than the tool holder body of tool 37. Because of the added length of the tool holder body for the first tool, the tool 35 actuates a code identifying limit switch 286 as the tool is moved by the drum into a position of proxmity to the tool change station 38. To secure the limit switch 286 in an operative position to be actuated by the coded tool the limit switch is bolted to a support plate 287 by a bolt 288, with the support plate 287 being secured to the housing 216 by means of a plurality of bolts 289, one of which is shown in FIG. 3. Actuation of the code identifying

11 lit switch 286 conditions the control circuit so that the /erse control limit switch 271 is again operable to inite slight counterclockwise rotation of the drum for po-ioning the coded tool in the tool change station 38. In dition, the switch 286 conditions the electro-hydraulic cuit for subsequently effecting an interchange of tools :ween the drum and the spindle during each machin-; cycle. Thus, the code identifying limit switch 286 actuated only by the first tool of a group of tools reired for a series of machining cycles and, as such, in:ates the starting point for subsequent series of machin-; cycles.

After a machining cycle has been started, the clockwise lexing and counterclockwise positioning movement deibed occurs during a machining cycle being performed a tool carried by the spindle. Thus, at the completion a machining operation performed by the tool in the ndle, the next required tool has already been indexably /anced to the tool change station 38 in preparation to next tool change.

Assume now that the first tool of a selected machining :le, such as tool 35, has been rotatably indexed to the l change station 38. Thus, the tool 35 is ready to be nsferred to the tool spindle 45 by means of the carrier With the first tool in the change station 38, the car-: 40 is in retracted, horizontal parked position engaging stationary positive stop 47, as represented by the ıntom lines in FIG. 1. To transfer the first tool from drum to the spindle 45, the carrier is rotated in a ckwise direction, FIG. 1, from its horizontal parked ition to a vertical position for moving the recess 42 ) engagement with tool 35 releasably held in the stordrum 32. If a tool is also carried in the spindle 45 :his time, the carrier 40 simultaneously grips the tool :he spindle, in this case with recess 43, as well as the l in the tool support 33 of the drum 32. This latter cribed condition is illustrated in FIGS. 1 and 2, in ch the carrier 40 is vertically positioned to simul:ously engage the tools 35 and 37, respectively carl by the drum and the tool spindle. During this initial l engaging rotation, the carrier 40 is dynamically mainıed in an axially retracted position by supplying hyulic pressure fluid to the power actuator 122 through a 290, while the line 127 is connected to drain. As :ribed hereinbefore, rotation of the carrier 40 is cted by the hyddaulic motor 112 which drives the ned sleeve 101 and shaft 44. Rotation of the axially d, drive sleeve 101 simultaneously rotates a pair of ι control discs 291 and 292, FIGS. 2 and 7, which are dly secured to the sleeve 101 in angularly adjusted :tion by set screws, such as set screw 303, which is wn in FIG. 7 securing the disc 291. In addition to screws, the cam discs 291, 292 are secured against ıl movement relative to the sleeve 101 by a snap ring which retains the discs in abutting engagement with ıoulder 305 presented by the drive sleeve 101. With arrangement, the cam discs are angularly adjustable he sleeve 101 to effect the proper timing synchronism :he tool change mechanism without being displaced .lly out of positions for selectively actuating limit ches 298 and 299. The cam disc 291 is provided with s 293 and 294 spaced 180° apart; and, the disc 292 rovided with cams 295 and 296 spaced 180° apart. cams 293, 294 and the cams 295, 296 rotate in axially :ed parallel planes, and in a manner that each pair xially spaced cams selectively actuate limit switches and 299 respectively, the latter being secured by bolts to a support bracket 302 which is secured to the ıe 28.

s will hereinafter be more fully described in conion with the electrical circuit, actuation of the limit ches 298 and 299 operate in combination with the trical control circuit for providing axial movement he carrier 40 and associated mechanism.

s the carrier 40 is rotated from a horizontal parked tion to a vertical tool engaging position, as shown in

12

FIGS. 1 and 2, a pair of axially biased tool locks 310A and 311A respectively associated with the recesses 43 and 42 are unlocked prior to the recesses engaging any tools carried by the spindle and the tool support located in the tool change station and thereby permitting the carrier to securely grip the tools. With the carrier dynamically retained in retracted position as it is rotated from parked to vertical position, the locks are unlocked as the movable plungers 310 and 311 are moved axially outward upon engaging cams 312 and 313 carried by the frame 28. To accomplish this, the cams 312 and 313 are provided with beveled faces 312A and 313A respectively extending in opposite directions. It will be apparent that actuation of the plungers occurs prior to the recesses 43 and 42 fully engaging any of the tools. As the plungers 310 and 311 engage the cams 312 and 313, the plungers are moved axially outward against respective springs which normally urge the plungers inwardly relative to both the frame and the carrier 40.

Since the locks 310A and 311A are identical, it is deemed sufficient to describe only one of them in detail. As shown in FIG. 2 and in greater detail in FIG. 8, the lock 310A is provided with a spring 314 having one end abutting an end face within a recess in an enlarged end 319 of the plunger 310, and with its opposite end abutting a cover plate 315 secured to the carrier 40 by cap screws 316.

With the plunger 310 displaced axially outward by the cam 312, a second plunger 320 slidably supported in a bore 321 in the carrier 40 is radially movable perpendicular to the path of movement of the plunger 310. Normally, the plunger 320 is biased radially outward toward the recess 43, as shown in FIGS. 2 and 8, by means of a spring 322 having one end abutting the bottom of the bore 321 and its opposite end abutting one end of the plunger 320. At its opposite end, the plunger is provided with a gripping or locking bar 325 which resiliently secures a tool within the recess 43 with sufficient force to effect axial withdrawal of a tool from its supporting socket, upon subsequent axial outward movement of the carrier. In this connection, it will be noted that both the recess 43 and the bar 325 are relived slightly to permit positive engagement with circular shoulders 37B and 37C of the tool holder 37, which shoulders are smaller in diameter than a central portion therebetween, as shown in FIG. 8. Radial movement of the plunger 320 and bar 325 is guided by the bore 321 and cooperating, enlarged openings formed within a pair of end plates 326, 327, respectively adapted to guide the gripping bar 325. The end plates 326, 327 are secured to the outer end of the carrier 40 by means of screws 328 and present the semicircular tool engaging recess 43 for gripping the tools, as best shown in FIGS. 1, 8 and 9. Since the details of both ends of the carrier are identical, it is deemed sufficient to show only one end in detail, as shown in FIGS. 2, 8 and 9. It will be readily apparent, however, that the tool engaging recesses 42 and 43 of the carrier 40 open in opposite directions, in a manner that initial tool engagement is always in a clockwise direction.

Referring now to FIG. 9, it is emphasized that the bar 325 is engaged by the tool and biased radially only when the tool recess 43 is initially moved into engagement with a tool or, at the completion of a tool change, when it is being withdrawn from engagement therewith. At the start of a tool change cycle, a tool 329, which is similar to tool 35, frictionally engages the bar 325 moving it and the plunger 320 radially inward as the carrier is rotated. Upon complete engagement of the recess 43 with the tool 329, the bar 325 and plunger 320 are again resiliently biased outward to preclude axial movement of the tool relative to the carrier.

To facilitate reinsertion of the tools after a 180° change in tool position, the locking bar so coacts with the tool engaging recess as to loosely constrain a tool therein for slight radial movement. So that the tool is held loosely within the recess, the clearance between the tool 329 and the reengaged locking bar 325 is extremely slight. For clarity, however, the clearance between the tool 329 and the bar 325 is shown in greatly exaggerated detail in FIG. 9. It is emphasized that it is desirable to have the tool held loosely within the recess 43 with just the proper amount of clearance so that the tool is radially centered when reinstated into the spindle 45 or tool support 33. Excessive clearance between the tool 329 and bar is undesirable since then the tool will not be brought into proper axial alignment with the spindle or tool support during reinsertion.

Proper radial outward adjustment of the locking bar 325 and plunger 320 is provided by means of a set screw 333 threaded into the carrier 40, as shown in FIG. 8. The inner end of the set screw 333 engages an inclined face 334 formed at the inner end of a longitudinal slot 335 formed in the plunger 320. The outer end of the slot 335 terminates in a shoulder 336 that is engaged by an enlarged flange 319 integrally formed with the plunger 310 to lock a tool in the recess 43 whenever the plunger 310 is moved out of engagement with the cam 312. A second, longitudinally elongated slot 338 extends through the plunger 320, and slidably receives the transversely positioned plunger 310 of the tool lock 310A. To operably coact with the locking plunger 310 the slot 338 is of such a length as to permit the plunger 320 to move axially upward without engaging the plunger 310. With this arrangement, as best shown in FIG. 8, it will be apparent that the radial outward position of the plunger 320 is defined by the adjustment of the set screw 333, and that the spring 314 is operable to urge the plunger 310 and integrally formed flange 319 axially inward to positively engage the shoulder 336 and thereby lock the tool engaging plunger 320 against inward radial movement. Thus, the tool plunger 320 is positively retained in its radial outward position whenever the plunger 310 has been moved out of engagement with the cam 312, i.e. after the carrier 40 has been moved axially outward to withdraw the tools, and thereby locking the tool in the tool recess 43. To facilitate movement of the plunger 320 and integrally secured tool bar 325 relative to the guide means provided by the carrier 40, a drilled line 320A extending longitudinally through the plunger opens into a transverse drilled line 325A in the locking bar. Lubricating oil from a source (not shown) is supplied to the lines 320A and 325A, the latter two lines likewise being connected to vent the chamber formed at the inner end of the plunger 320 and containing the spring 322. Although the locking arrangement described is shown in connection with the recess 43, an identical locking arrangement is provided for the tool recess 42 at the opposite end of the carrier 40.

Assume now that the carrier is rotated to a vertical position abutting the fixed stop 48, as shown in FIG. 1, and resiliently grips the tools 35 and 37 in the recesses 42 and 43 respectively. To insure proper resilient gripping of the tools, and to provide for initial incremental angular positioning adjustment of the carrier 40 with respect to the fixed stop 48, adjusting screws 351 and 352 are provided in each end of the carrier 40. Thus, by rotating the screws 351 and 352, adjustments are made to define the initial rotary movement of the carrier for properly gripping the tools.

With the carrier in a vertical position gripping tools 35 and 37, as illustrated in FIG. 2, the tools are simultaneously withdrawn from the tool support 33 and the spindle 45 by axially outward movement of the carrier 40. Prior to withdrawing the tools, the power actuator 198 must first be actuated by supplying pressure fluid to it via the line 199 to release the collet 194 gripping the tool 37, the collet being maintained in released condition until the tool change cycle is completed. Outward movement of the carrier 40 and the shaft 44 from their dynamically retracted position is then effected by means of the power actuator 122 which is connected to the block 96 by means of the piston rod 123. As the shaft 44 is moved outwardly, movable stop 49 is also moved outwardly since the supporting cylinder 146 therefor is fixedly secured to the block 96. In addition, since the movable stop cylinder 146 is connected to the hydraulic line 151, supplying pressure fluid to the power actuator 122 effects a simultaneous transmission of pressure fluid to the cylinder 146 urging the piston 145 outwardly to the limit of its movement at this time. Actually, during the outward withdrawal stroke of the actuator 122, the carrier 40 is maintained in its vertical position. During withdrawal, therefore, the flange 141 of the movable stop 49 is hydraulically urged into abutting engagement with the inner face of the vertically positioned carrier 40, as best shown in FIG. 3. As the carrier 40 begins to move outwardly, a dog 341 secured to the block 96 by bolts 342 moves out of engagement with a limit switch 343. As the carrier 40 completes its outwardly extended movement to fully extract tools from the spindle and tool support, a forwardly spaced dog 345 secured to one side of the block 96 by means of bolts 347, as illustrated in FIGS. 2, 3 and 10 actuates another, sequencing control limit switch 346.

Upon completion of its axial outward movement, the carrier 40 is next rotated in a clockwise direction, as viewed in FIG. 1, 180° for repositioning the tools prior to retracting the carrier for reinserting the interchanged tools into the spindle and tool support respectively. As the carrier 40 begins to rotate, the flange 141 of the movable stop 49 is still being dynamically urged into abutting engagement with the inner face of the carrier. As soon as the carrier 40 is rotated out of vertical alignment with the stop 49, the latter is urged axially outward to the limit of its secondary positioning stroke due to the continued application of pressure fluid to the cylinder 146. It will be apparent that, as the inner face of the carrier 40 is rotatably moved out of engagement with the movable stop 49, the movable stop 49 is moved outwardly until the shoulder screw 155 abuts the end of the cylinder 146, further compressing the spring 158. With the movable stop 49 fully extended, the carrier 40 continues to be rotated a full 180° into both abutting and intermeshing engagement against the movable stop, with the flange 141 intermeshingly engaging a carrier slot 350B. As shown in FIGS. 1 and 3, the carrier 40 is provided with a pair of slots 350A and 350B respectively formed at opposite ends and in opposite edges of the carrier 40 presenting the respective recesses 42 and 43.

Rotation of the carrier 40 through 180° effects like rotation of the cam discs 291 and 292 which respectively actuate the limit switches 298 and 299. The switches 298 and 299, together with the switches 343 and 346, respectively actuated during axial movement of the carrier 40, are disposed to function in combination with the electro-hydraulic control circuit to effect sequencing control of carrier movement.

After the 180° rotation of the carrier 40 positioning the tools for exchange, the carrier as well as the shaft 44 are retracted by supplying hydraulic pressure fluid to the power actuator 122 via line 290 and connecting line 126 to drain. As the carrier 40 completes its movement to its fully retracted position, the lever of the limit switch 341 engages the dog 341 secured to the block 96 which actuates the switch upon complete retraction of the carrier. Actuation of the limit switch 341 conditions the electrical circuit for counterclockwise movement of the carrier 40 to its horizontal parked position.

With the retraction of carrier 40, the movable stop is also retracted by the power actuator 122 since it is connected to the block 96 which is connected to the shaft 44. In addition, during retracting movement the flange 141 is engaged in the slot 350B of the carrier and thus is also moved inwardly with the carrier. During retracting movement, the movable stop cylinder 146 is connected to exhaust via hydraulic lines 151 and 126. With the movable stop flange 141 meshingly engaging the slot 350B in the carrier, however, the spring 158 does not function this time, to effect relative additional retracting move-
...nt of the stop, even though the stop cylinder 146 is
...ctivated. Continued positive meshing engagement of
...: carrier slot 350B with the movable stop flange 141
dynamically maintained by the motor 112, the latter
...ng continuously connected to urge the carrier in a
...ckwise direction until the interchanged tools are re-
...erted in the respective storage and spindle sockets.
...ring the reinserting portion of the tool interchange
...:le, therefore, the movable stop 49 functions as an
...ally movable guide member to maintain the carrier
...l recesses 42 and 43 in proper axial alignment with
... storage socket and spindle socket.
...rior to the interchanged tools being fully reinserted
...) the storage and spindle sockets, the tool lock plungers
...) and 311 are moved axially into engagement with the
...uating cams 312 and 313 to release the tool locks in
...paration for effecting pivotable return movement of
... carrier 40 to parked position. Inasmuch as the carrier
... already been rotatably displaced 180° from its start-
... position, as viewed in FIGS. 2 and 8, the plungers
...) and 311 are now respectively moved into abutting
...agement with the stationary actuating cams 312 and
...i. Thus, as the tools are fully reinserted the tool locks
...A and 310A are completely disengaged and the cam
... secured to the block 96 again actuates the limit
...tch 343.
...nitially, reactuation of the switch 343 by reinserting
...vement of the carrier shaft 44, deactivates the cylinder
...;, thereby permitting the compressive force exerted by
... Belleville spring 202 to reactuate the collet 194 into
...nping engagement with the tool now inserted therein.
...<t, with the cylinder actuator 122 remaining operatively
...nected to forcibly maintain the carrier 40 in its fully
...acted position, the motor 112 is actuated to effect
... counterclockwise rotation of the carrier 40 to its
...izontal parked position abutting the stationary positive
...) 47. As the carrier 40 begins to rotate in a counter-
...:kwise direction in its return movement to horizontal
...<ed position, the slot 350B is moved out of engagement
...1 the flange 141 of the movable stop. Thereupon,
... movable stop 49 is moved inwardly relative to the
...ne 28 and the cylinder 146 by means of the com-
...sion spring 158, with the inward spring biased move-
...lt terminated by the shoulder 157 engaging the left-
...d end of the cylinder 146 as shown in FIG. 2.
...ne complete sequence of movements of the carrier
...n effecting an interchange of tools between the storage
...n and the tool spindle, as hereinbefore explained,
...chematically represented in the seven (7) diagram-
...ic views, represented in FIGS. 12 to 12F inclusive.
...he particular cycle described, it will be noted that
... carrier 40 is so positioned in horizontal parked posi-
..., in FIG. 12, that the tool receiving socket 42 is
...tioned to grasp the tool 35 carried by the storage
...n 32, as viewed in FIG. 12A. After the interchanged
...; have been reinserted in the storage drum and tool
...dle, respectively, as viewed in FIG. 12E, the carrier
...s returned in counterclockwise direction to parked
...tion abutting the stationary stop pin 47, as shown
...'IG. 12F. The various essential movements of the
...ler 40 and axially movable guide stop 49 are repre-
...:d by the arrow designations shown in FIGS. 12 to
... inclusive, and are identical for all tool interchanges
...een the storage drum and the tool spindle. At the
...pletion of the illustrated tool change cycle, however,
...ll be apparent that the carrier 40 has been displaced
... from its starting parked position, FIG. 12, to the
...ed position shown in FIG. 12F. As shown in FIG.
... the carrier is so parked in abutting engagement with
...positive stop 47, that the tool receiving recess 43 is
...ioned to engage a tool carried by the storage drum
...l initiating the next, or alternate tool change cycle.
...le hydraulic circuit for supplying operating hydraulic
...ure fluid to control the operation of the machine
... is schematically illustrated in FIG. 11. As there shown, an electric motor 365 is connected to drive a
hydraulic pump 366 to withdraw hydraulic fluid from a
sump 367 through a conduit 368 and discharge the fluid
under pressure into a main supply conduit or line 369.
A pressure relief valve 370 is connected in parallel with
the pump 366 to conduits 368 and 369 providing a safety
device against excess pressure in the main line 369.

To illustrate the operation of the hydraulic circuit, a
typical tool interchange cycle will be described in con-
nection therewith and as dynamically illustrated in FIGS.
12 to 12F, inclusive. Thus, reference will be made to
FIG. 11 illustrating the hydraulic circuit as well as FIGS.
12 to 12F, inclusive, in describing such tool change cycle.
It will be assumed that the first tool in the particular
machining cycle, namely tool 37, is already in the machine
spindle 45 and that the tool storage magazine 32 has
been indexed, positioning the next tool in the cycle, tool
35, in the tool change station. Further, assume that a
machining operation with tool 37 has just been com-
pleted and that the spindle 45 is still rotating. With
the tool storage magazine 32 indexed presenting the next
tool in the tool change station, the drum 32 is urged
counterclockwise to obtain the final positioning of the
tool. As described hereinbefore, final positioning is
effected by rotating the drum counterclockwise moving
one of the dogs 251 into abutting engagement with the
lever 262. It is emphasized that the drum 32 is urged
counterclockwise during a tool change cycle as well as
during a machining operation and is only moved clock-
wise when it is indexed to present a new tool in the tool
change station. To rotate the drum counterclockwise,
a solenoid 373 connected to a valve spool 374 of a control
valve 375 is energized moving the valve spool leftwardly
compressing a spring 380. Leftward movement of the
valve spool 374 connects the hydraulic pressure line 369
with the line 244 via a branch line 376 and a line 377
in the valve spool 374. Exhaust fluid from the hydraulic
motor 215 then flows through the line 243 to a drain
line 372 via a line 378 in the valve spool 374 and a
branch line 379. The rate of flow of exhaust fluid in
the exhaust line 372 to the sump 367 from all hydrauli-
cally operated units except the spindle brake 187 and the
motor 112 is controlled by a flow control valve 381.

Upon a signal, either manual or program controlled,
calling for a change of tools, a spindle drive clutch (not
shown) is deactuated in well-known manner to interrupt
the power drive to gears 180 or 181, FIG. 2; and, the
spindle brake 187, FIG. 11, is actuated to stop spindle
rotation. The operation of the spindle brake 187 is con-
trolled by a solenoid valve 383 having a valve spool 384
which is spring biased rightwardly in the valve by means
of a spring 385. To actuate the spindle brake 187 to
stop spindle rotation, a solenoid 386 connected to the
valve spool 384 is energized moving the valve spool left-
wardly against the spring 385. With the valve spool 384
in the leftward position, pressure fluid flows from the main
supply line 369 through a line 388, a line 389 in the
valve spool and the line 191 to the spindle brake 187.

Upon deenergization of the solenoid 386, for example
after a tool change cycle has been completed, the valve
spool is moved rightwardly by means of the spring 385
releasing the spindle brake 187. The clutch (not shown)
is then connected to be reengaged to rotate the spindle
45. Whenever the valve spool 384 is returned to its right-
ward position, a line 397 in the valve spool connects the
line 191 to the branch drain line 395.

After the spindle 45 has been braked to a stop, the
carrier 40 is rotated 90° in a clockwise direction, as shown
in FIGS. 12 and 12A, to grasp tools carried by the tool
support 33 of the drum 32 and in the spindle. During
this initial tool engaging rotary movement of the carrier
40, the carrier is retained in a retracted position, as well
as rotated by means of hydraulic pressure fluid. To
forcibly retain the carrier in a retracted position, a sole-
noid 399 of a solenoid valve 401 is energized to supply
pressure fluid to the power actuator 122 urging a piston 402 leftwardly, as viewed in FIG. 11. Energization of the solenoid 399 effects leftward movement of a valve spool 403 against a spring 405 and connects the pressure supply line 369 to the line 290 via a line 404 in the valve spool, and the line 127 with the drain line 372 via a valve spool line 409.

To effect clockwise rotary movement of the carrier 40 when the carrier is in a retracted position, as shown in FIGS. 12 and 12A, a solenoid 410 of a solenoid valve 412 is energized moving a valve spool 411 rightwardly against a spring 413. Upon rightward movement of the valve spool 411, hydraulic pressure fluid flows from the supply line 369 through a branch line 418, a line 419 in the valve spool 411 and thence through a line 420 to the hydraulic motor 112. Hydraulic fluid from the motor 112 returns to the sump 367 via a line 421 having communication with a line 422 in the valve spool 411 and a line 423 connected to the drain line 372. Hydraulic fluid returning to the sump 367 from the motor 112 flows through a flow control valve 424 in the line 423. The flow control valve 424 is adjustable to vary the rate of discharge of hydraulic fluid, which in turn controls the rate of rotary movement of the carrier 40.

When the carrier 40 has rotated to a vertical position, as shown in FIG. 12A, grasping tools 35, 37, the solenoid 410 is deenergized stopping rotation of the carrier. Deenergization of the solenoid 410 returns the valve spool 411 to its central position in the valve 412 by means of the spring 413. As shown in FIG. 11, the valve spool 411 is located in the central position by the spring 413 disposed at one end and a spring 429 disposed at its opposite end. With the valve spool 411 in its central position, the lines 420 and 421 are connected to the drain line 423 via lines 430 and 431 in the valve spool 411.

With the carrier 40 in the vertical position, FIG. 12A, the collet 194 is released so that the tool 37 can be axially withdrawn from the spindle 45. To release the collet 194, a solenoid 436 of a solenoid valve 438 is energized to move a valve spool 437 leftwardly compressing a spring 439 as viewed in FIG. 11. With leftward movement of the valve spool 437, pressure fluid flows from the pressure line 369 through a branch line 440, a line 441 in the valve spool 437 and through the line 199 to the power actuator 198. Admission of pressure fluid to the power actuator 198 urges the piston 446 rightwardly. Rightward movement of the piston 446 urges the piston rod outwardly to compress the Belleville spring 202, releasing the collet 194. Simultaneously the opposite side of the piston 446 is connected to the drain line 372 via a line 447, a drilled line 448 in the valve spool 437 and a branch line 449 connected to the line 372.

After the collet 194 is released, the tools 35 and 37 are extracted from the tool support and spindle respectively by moving the carrier 40 axially outward, to fully extended position as illustrated in FIG. 12B. To move the carrier 40 axially outward, the solenoid 399 connected to the valve spool 403 is deenergized, and a solenoid 453 is simultaneously energized moving the valve spool rightwardly against a spring 454. Rightward movement of the valve spool 403 connects the line 127 with the supply line 369 via a line 455 in the valve spool 403 to supply pressure fluid to the power actuator 122 urging the piston 402 and carrier 40 outwardly. Simultaneously the opposite side of the piston is connected to drain via the line 290, a line 456 in the valve spool 403 and the line 372. Simultaneously with the flow of pressure fluid to the power actuator 122 pressure fluid flows through the flexible branch line 151 connected to the lines 126 and 127 into the cylinder 146 to urge the movable stop 49 outwardly, as shown in FIG. 12B. As described hereinbefore, pressure fluid urges the movable stop 49 outwardly into abutting engagement with the inner face of the vertically positioned carrier 40. Subsequent clockwise rotation of the carrier 40 through a predetermined angular distance at the start of its 180° interchange, moves the carrier out of engagement with the movable stop 49 permitting the movable stop to move axially outward until the shoulder screw 155 abuts the cylinder 146, as will be understood by viewing FIG. 2. After the stop 49 is urged outwardly to its limit of movement, it will be understood that the flange 141 carried thereby is axially positioned for meshing engagement with one or another of the carrier slots 350A or 350B.

To rotate the carrier 40 clockwise in its outwardly extended position, the solenoid 410 is again energized moving the valve spool 411 rightwardly connecting the pressure fluid line 418 to the line 420 via the line 419 in the valve spool, as described hereinbefore. With the motor 112 actuated as described, the carrier 40 will rotate 180° in a clockwise direction as best shown in FIGS. 12B, 12C and 12D. To limit clockwise rotation to 180°, the carrier is urged into abutting engagement with the outwardly displaced movable stop 49, as shown in FIG. 12D, with the stop flange 141 intermeshingly engaging the slot 350B, to stop the rotary movement of the carrier. FIG. 12C is representative of an intermediate position of the carrier 40 during its 180° path of tool travel, and during which the movable guide stop 49 is hydraulically urged to its outermost position for stopping carrier movement with the tools axially aligned for reinsertion.

With the completion of 180° of rotation of the carrier 40, the tool 35 that was previously in the tool support 33 is now positioned to be inserted into the spindle 45 and the tool 37 that was previously in the spindle 45 is positioned to be inserted into the tool support 33, as best shown in FIG. 12D.

To retract the carrier 40 to insert the tools 35 and 37 into the spindle 45 and tool support 33 respectively, the solenoid 399 is energized and the solenoid 453 simultaneously deenergized, moving the valve spool 403 leftwardly connecting the pressure line 369 with the line 290 via a line 404 in the valve spool, thereby supplying pressure fluid to the power actuator 122 to move the piston 402 leftwardly in a retracting stroke. At the same time, leftward movement of the valve spool 430 connects the line 127 from the power actuator 122 as well as the line 151 from the cylinder 146, FIG. 2, of the movable stop 49 to the exhaust line 372 via the line 409 of the valve spool.

During retracting movement of the carrier 40, the solenoid 410 is maintained in energized condition to forcibly retain the carrier slot 350B in continuous meshing engagement with the axially movable stop flange 141. Thus, the stop 49 now functions as an axially movable guide member until the interchanged tools are fully inserted in their respective sockets.

As the carrier 40 retracts, the cam 345, FIG. 2, moves out of engagement with the lever of the limit switch 346. Upon complete retraction, the switch 343 is actuated by the cam 341, providing a signal in the electrical circuit to deenergize the collet release solenoid 436. Upon deenergization of the solenoid 436, the valve spool 437 is moved rightwardly by the spring 439 connecting the line 199 from the power actuator 198 to the branch drain line 449 via line 457 in the valve spool 437. The line 449, in turn, is connected to the drain line 372. As this happens, the piston 446 is retracted by pressure fluid supplied via line 447, the latter being connected by the valve spool line 458 and line 440 to the main pressure supply line 369. With the power actuator 198 now connected to drain, the Belleville spring 202 urges the shaft 196 inwardly, FIG. 11, closing the collet 194 to securely grip the tool 35, FIG. 12E. With the actuation of the limit switch 343, counterclockwise rotation of the carrier 40 is initiated, disengaging the carrier 40 from the tools and rotating it to a horizontal "parked" position, FIGS. 12E and 12F. During the counterclockwise rotation of the carrier, the solenoid 399 is retained energized to maintain the carrier in a retracted position while it is being rotated to the "parked" position.

To rotate the carrier 40 90° in a counterclockwise direction to its parked position, the solenoid 410 is deenergized, and a solenoid 460 is simultaneously energized moving the valve spool 411 leftwardly against the spring 429. Leftward movement of the valve spool 411 connects the pressure fluid supply line 418 with the line 421 via a line 461 in the valve spool, and the drain line 423 with the line 420 via a line 462 in the valve spool. Counterclockwise rotation of the carrier 40 continues until the cam 296 carried by the disc 292 actuates the limit switch 299 which conditions the electrical circuit deenergizing the solenoid 460. It will be noted that the cam 295, as well as the cam 296 actuate the limit switch 299 to terminate counterclockwise rotation of the carrier 40. However, it is emphasized that only one cam actuates the switch 299 during one interchange cycle and the other cam spaced 180° apart, actuates the switch during each alternate cycle. Upon deenergization of the solenoid 460, the valve spool 411 is spring biased to its central position by the springs 413 and 429 connecting the motor 112 to the drain line 423 via the lines 420 and 421, and the lines 430 and 431 in the valve spool 411.

After the carrier 40 has been rotated 90° in a counterclockwise direction to the parked position, actuating the limit switch 299, the magazine 32 is again indexably rotated in a clockwise direction to move the tool 37, FIG. 2F, out of the tool change station and position the next tool in the cycle, tool 36 shown in FIG. 1, in the tool change station. To rotate the drum 32 in a clockwise direction, the solenoid 373 is deenergized and a solenoid 466 is energized, moving the valve spool 374 of the valve 375 rightwardly against a spring 467. Rightward movement of the valve spool 374 connects the pressure line 376 with the line 243 via a line 468 in the valve spool 374 to supply pressure fluid to the motor 215 to drive the drum 32 in a clockwise direction. Exhaust fluid from the motor 215 is returned to the sump 367 via the line 244 having communication with line 469 in the valve spool 374 and the line 379 connected to the drain line 372. Upon completion of a clockwise indexing movement, final counterclockwise positioning movement of the drum 32 is again automatically effected with final positioning of the next tool in the change station being effected by engagement of the trip lever 262 with one of the dogs 251. Counterclockwise positioning movement is effected by deenergizing the solenoid 466, and simultaneously energizing the solenoid 373 moving the valve spool 374 leftwardly, connecting the pressure line 376 with the line 244 via the line 377 to supply pressure fluid to the motor 215. Exhaust fluid from the motor is returned to the sump 367 via lines 243, 378, 379 and 372. With the carrier rotated to the "parked" position, the solenoid 399 is deenergized returning the valve spool 403 to its central position by means of the springs 405 and 404. In the spring biased central position, the lines 127 and 290 are connected to the drain line 372 via lines 476 and 477 in the valve spool 403.

At this point a tool change cycle has been completed. As mentioned hereinbefore, the solenoid 373 is energized during a machining cycle to urge the drum 32 counterclockwise retaining the dog 251 in engagement with the lever 262 thereby preventing spurious movements of the drum and retaining the next indexed tool positioned in the tool change station. Whenever the machine is stopped by disconnecting the source of electrical power, the solenoid 373 is deenergized and the valve spool 374 moved to a central position by the springs 380 and 467. In the central position, as shown in FIG. 11, the lines 243 and 244 are connected to the drain line 379 via lines 474 and 475 in the valve spool 374.

A modified form of the invention heretofore described is illustrated in FIGS. 13, 14 and 15. The modified form of the invention is particularly related to a modified drum or tool storage magazine having approximately the same diameter as the drum 32 illustrated in FIG. 1, but having a capacity to carry a greater number of tools. To adapt a drum of the same diameter to carry more tools, the tool supports are spaced closer together in the drum periphery, and pivotably supported by the drum rather than carried conically as illustrated in the original embodiment. Thus, in this manner, there is provided a greater number of tool supports without enlarging the diameter of the storage drum. The closer spacing of the tool supports is rendered possible by the pivoting of the tool support and tool out of circular alignment with the remaining tool supports and tools. This allows the change arm 40 to swing and grip the tool without interference from the other tools and their supports, whereas, with the construction of FIG. 1 the tool supports have to be spaced to allow for the swing of the arm. Irrespective of which drum is used in connection with the machine tool, the mounting and drive mechanism for each type drum are identical. Likewise, the tool change mechanism is used in identical form, irrespective of whether it is used in a machine provided with the conical type tool drum or the pivoting tool type storage drum. With interchangeable drums, manufacture of the machine for machining cycles requiring few tools as well as cycles requiring numerous tools is greatly simplified.

In describing this modified form of the invention, elements common to both embodiments of the invention are identified by the same reference numerals in the figures depicting each embodiment. Further, since the same drive mechanism is used for each drum, the drive mechanism described heretofore in connection with drum 32, and illustrated in FIG. 4, is adapted to effect indexable movement of the modified drum.

Referring now to FIGS. 13 and 14, a modified tool storage magazine or drum 501 is rotatably carried by the shaft 230, which is driven by the hydraulic motor 215 as shown in FIG. 4. The shaft 230 is rotatably mounted in the bearings 233 and 234 and extends through the bored opening 239 of the boss 238 so as to be flush with the upper face of the drum 501. Bolts 240 extend through the boss 238 to secure the drum 501 to the flange 237 of the shaft 230. The periphery of the drum 501 is provided with a plurality of radial slots or guideways 502 integrally formed therein in radially spaced relationship. Each slot or guideway 502 is of a predetermined width and is provided with a pivotable rectangular cartridge or tool support 503 for carrying a tool. In addition to carrying a tool support, the spaced parallel sides of each radial slot or guideway 502 guide the tool support for pivotable movement. Inasmuch as each rectangular tool support and each cooperating guideway is identical with all the other pivotable tool supports and guideways presented by the drum, it is deemed sufficient to describe in detail only one tool support and guideway.

Each tool support 503 comprises a rectangular block pivotally supported in its respective slot 502 by means of a pin 505 having its opposite ends mounted in the drum 501 and projecting through a bored opening presented by a shoulder 506 integrally formed with the support 503, as shown in FIGS. 14 and 15. To carry a toolholder with a tool, the tool support 503 is provided with a bored opening 507 having its longitudinal axis normally parallel to the axis of drum rotation, and perpendicular to the axis of rotation of the support about the pin 505. To releasably retain a toolholder in the tool support 503, a detent mechanism 508 is provided with each tool support and includes a spring biased ball extending radially inward to engage a cooperating annular groove 512 presented by the toolholder, as shown in FIG. 14. Inasmuch as each tool support block 503 is pivotable outwardly about its cooperating pivot pin 505, it is necessary to maintain all of the supports in upright position and parallel to the axis of drum rotation during indexable, tool selection movement thereof.

To this end, the radially slotted tool carrying storage drum 501 is provided with a hollow central portion within which is supported a concentrically disposed circular stationary tool guide track or fixed ring 513. As will be explained, the tool guide track comprises a stationary track 513 having one peripheral opening to receive a radially movable track section 523, as shown in FIGS. 13, 14, 15 and 20. Both the stationary track 513 and the movable track section 523 are secured to the central housing 216, by bolts 520, one of which is shown in FIG. 14. During indexable tool selecting movement of the drum 501, the movable track section 523 is retracted, as shown in FIG. 14, in a manner that an arcuate outer surface presented thereby coacts with the track 513 to provide a continuous peripheral surface 514. The peripheral circular surface 514 presented by the stationary track and the retracted track section extends throughout a full 360°, and is parallel to the axis of rotation of the storage drum 501. To provide an operative connection between the tool support 503, and peripheral surface 514 presented by the coacting tracks 513 and 523, the tool support 503 is provided with a pair of guide rollers 517 and 518 rotatably secured to a shoulder 506 integrally formed with the support 507, and disposed on opposite sides of the pivot pin 505 about which the tool support pivots. Each pair of guide rollers 517 and 518 is journalled to rotate about an axis parallel to the axis of drum rotation, and perpendicular to the axis of the pivot pin 505 about which the associated tool support 503 is journalled. During indexable movement of the drum 501, the tool support 503 is guided along the continuous peripheral track surface 514 by the rollers 517 and 518, as best shown in FIG. 14, maintaining the longitudinal axis of the tool support 503 parallel with the axis of drum rotation. During indexable movement of the drum, the rollers 517 and 518 of each of the tool supports are in rolling engagement with the peripheral track surface. The tools are normally carried in this position, i.e. with the longitudinal axis of the tool support parallel with the axis of drum rotation, which for the sake of clarity in this description will be identified as the "indexable position" for the tools. Thus, even though the drum is stationary, i.e. not being rotated, the tools are held in the "indexable position" by the rollers 517 and 518 since they are in contact with the track 513.

In addition to guiding the tool supports during indexing movement of the drum, the radially movable track section 523 functions to pivot a tool support from the "indexable position" to a tool change station or tool change position generally identified by the reference numeral 525 and best illustrated in FIGS. 13 and 15. To accomplish this, the track section 523 is carried for radial outward movement in substantially spaced parallelism above the axis of the bodily movable tool change carrier 40. When in the tool change station or tool change position 525, the longitudinal axis of the tool support 503 is in a plane parallel with the longitudinal axis of the spindle 45 and positioned in vertical alignment with the spindle 45 and the axis of rotation of the carrier 40. Thus, a tool support 503 is indexably advanced by rotation of the storage drum to an index position in substantial radial alignment with the radially movable track section 523. To move the tool support 503 from the "indexable position" to the tool change position for subsequent removal of the tool from the tool support, the tool support is pivoted radially outward about its pivot pin 505. As viewed in FIG. 13, the movable track section 523 is located adjacent to the tool change station in order to pivot a tool support 503 to the tool change position. Further, as shown in FIG. 13, the movable track section is displaced to the left of a vertical plane through the spindle 45, shaft 44 and tool support 503. The movable track section 523 is offset to the left of such vertical plane in order to provide timed coaction of the tilting tool support with the clockwise indexing movement of the drum 501 and the counterclockwise rotation positioning the tool in the tool change station. To pivot the tool support 503 to the tool change position while still retaining the rollers 517 and 518 in contact with the movable track section 523, the movable track section is moved rectilinearly as well as arcuately about the pivot pin 505 in a radially outward direction.

With the movable track section 523 retracted, as shown in FIG. 14, it will be apparent that the outer face thereof is perpendicular to an imaginary radial line intersecting the rotational axis provided by the pivot pin 505 for the tool support 503. With the tool support 503 pivoted outwardly about its axis, as shown in FIG. 15, an imaginary radial line extending outwardly thereof is maintained in identical perpendicularity to the outer face of the bodily moved track section 523. Irrespective of the direction of pivotable movement of the tool support 503 about its pin 505, the guide rollers 517 and 518 rotatably carried thereby are maintained in continuous guiding engagement with the outer arcuate face of the movable track section 523, To achieve this result, the movable track section 523 is urged to pivot about its axis, and, at the same time its axis is urged to move bodily outward in an arcuate path parallel to the tool support pivot pin 505. The two separate components of movement are arranged to produce resultant bodily movement of the track section 523 in a manner that the outer arcuate face thereof continuously engages the tool support guide rollers 517 and 518.

To effect the required bodily movement of the track section 523, there is provided a novel extensible linkage mechanism 528 comprising a plurality of spaced apart pivotably intersecting links that are disposed in symmetrically spaced apart identical pairs, such as the pair of links 530 and 531.

At their forward ends, the links 530 and 531 are pivotably secured by a pivot shaft 532 to the opposite outer vertical faces of inwardly projecting flanges 53? and 534 integrally formed with the movable track section 523. It will be apparent that the shaft 532 constitutes the major, bodily movable pivot axis for the movable track section 523 as the latter is moved in either direction.

Since each pair of like links operates in synchronism only one link of a pair will be hereinafter described to facilitate the description.

Toward its rearward end, the link 531 is pivotally secured by bolts 539 and 540 to parallel, movable support links 541 and 542 for extensible movement. The support links, in turn, are pivotably connected by bolts 545 and 546 to a vertically upstanding flange 547 integrally formed with a linkage support bracket 548. The support bracket 548 is secured by bolts 549 to a depending base section 550 integrally formed with the support base for the ring 513. To maintain the entire linkage mechanism 528 in synchronism, the rearward pair of like links 54 and 543, are integrally formed with a transverse bar 55 comprising, in effect, a single unitary U-shaped member. In like manner, the links 541 and 541A are joined by a integrally formed transverse bar 553 forming a U-shape member.

At its upper end, the link 541 is integrally formed with a lateral arm that is pivotably connected by a bolt 55 to one end of a tilt control link 555. For controllir tilting movement of the movable track section 523 th outer end of the control link 555 is pivotably secured 1 a shaft 556 extending through suitable bored holes ; the inwardly extending track section flanges 533 and 53 Between the flanges, the shaft 556 is disposed to pivotab support a tubular support sleeve 560 that is secured the outer end of a piston rod 561 controlled by a pow actuator cylinder 562. The opposite end of the cylind 562 is pivotally secured by a bolt 563 to a vertical flan 55 integrally formed with the linkage support bracket 548.

For operating the power actuator cylinder 562 to move tool in the tool support 503 from its "indexable position" to the tool change position, hydraulic pressure fluid is applied to the power actuator cylinder via a line 569 while a line 570 having one end connected to the opposite end of the power actuator cylinder is connected to drain. Conversely, to return the tool support 503 from the tool change position to the index position, pressure fluid is applied to the power actuator cylinder 562 via the line 570 while the line 569 is simultaneously connected to drain.

In addition to supporting a tool in the "indexable position" as well as in the tool change position, the tool support 503 functions as a movable stop limiting counterclockwise movement of the drum and effecting final positioning of the tool support in the tool change station. To this end, when the tool support 503 is in the tool change station, the tool support is simultaneously in a line of interference with a positive stop 572 fixedly secured to the frame 28. Counterclockwise rotation of the drum for effecting final positioning of the tool support 503 will move one side of the tool support into abutting engagement with the fixed stop 572, as shown in FIG. 15, terminating the counterclockwise rotation. It is emphasized, however, that the tool support 503 is only in line of interference with the fixed stop 572 when it is in the outward tool change position. Therefore, when the tool support is in the retracted or "indexable position," it will bypass the fixed stop 572 irrespective of direction of drum rotation. It will be understood that during the primary indexing movement of the storage drum, the next selected tool is moved beyond the positive stop 572 in a clockwise direction; the support 503 is then tilted outwardly; and, the drum rotation reversed to urge the outwardly tilted tool support in a counterclockwise direction into abutting engagement with the positive stop 572.

To best illustrate the operation and novel features of the modified invention, a typical indexing movement will be described with reference to FIGS. 13, 14 and 15. In this modified form of the invention as well as in the embodiment illustrated in FIGS. 1, 2 and 3, the drum is rotatably driven in a clockwise direction, as viewed in FIG. 13, for indexing the drum for beginning a machining cycle as well as for advancing subsequent tools to the tool change station after a machining cycle is begun. Likewise, in both embodiments, the drum is rotated a limited distance in a counterclockwise direction to effect final positioning of the tool in the tool change station. In the modification providing the tilting tool support, the drum 501 is indexably rotated in a clockwise direction to position the first or code identified tool of a machining cycle adjacent the tool change station 525. To this end, a longer code identified tool extends downwardly a sufficient distance to actuate the limit switch 286A, initiating the beginning of the machining cycle and conditioning the electrical circuit for subsequently moving that tool into the tool change station. However, before this takes place, the drum 501 will continue to rotate clockwise an additional predetermined angular distance until a guide roller 518 associated with a different, angularly spaced apart tool support 503 actuates the sequence control limit switch 271A, as shown in FIG. 14. Actuation of the limit switch 271A effects reversal or counterclockwise rotation of the drum and simultaneously actuates the power actuator cylinder 562 which pivots the tool support 503 carrying the first tool in the machining cycle into the tool change station as the drum begins to rotate in a counterclockwise direction. In other words, actuation of the limit switch 271 simultaneously effects counterclockwise rotation of the drum and movement of the movable track section 523 positioning the tool support 503 into the tool change station. As mentioned hereinbefore, with the tool support 503 in the tool change position, counterclockwise rotation of the drum will move one side face of the outwardly tilted tool support into abutting engagement with the fixed stop 572 and thus effect final positioning of the tool support in the tool change station. When in the tool change station, the lower limit of movement of the tool support 503 is adjustably preset by means of a set screw 573 threaded into the lower integrally formed U-shaped section of the drum 501 beneath each guideway 502, as shown in FIG. 14. By rotating the set screw 573, the horizontal position of the tool support is pivotally adjusted to align the longitudinal axis of the bored opening of the tool support parallel with the longitudinal axis of the spindle 45 when the tool support is in the tool change station.

A novel feature incorporated in this invention that is particularly related to self-reversing tapping tool holders is a locking mechanism 580 illustrated in FIGS. 16 and 16A. It will be apparent that self-reversing tapping tool holders are particularly useful with machine tools having only one direction of spindle rotation. However, self-reversing tapping tool holders are not limited to nonreversing spindles but can be used equally as well with machine tools having reversing spindles thereby omitting reversed rotation of the spindle in tapping operations.

With a self-reversing mechanism, a tap is backed out of a tapped hole without changing direction of spindle rotation. As a necessary incident to the self-contained reversing mechanism to effect reversed rotation of the tap, a section of the tapping tool holder must be bodily held stationary relative to the rotating spindle. The bodily held stationary reverse control section can be of any configuration that is compatible with a locking means to hold it stationary relative to the spindle.

The locking mechanism 580, shown in FIGS. 16 and 16A, functions to bodily hold a flanged, reverse control section 581 of a tapping tool holder 582 against rotation relative to the spindle 45. The spring biased lock 580 is secured to the column 26 adjacent to the periphery of the spindle 45 by a pair of bolts 583 and 584 and includes a U-shaped frame 585. Thus, the lock 580 is stationary relative to the rotatable spindle 45 and a flanged retaining plate 169A secured thereto by cap screws, such as the screw 169B. A dog 586 is pivotally carried at one end of the frame 585 by means of a pin 587. A second pin 589 is carried by the frame 585 in parallel spaced relationship to the pin 587 and extends through an enlarged hole 590 presented by the dog 586. Since the diameter of the hole 590 is larger than the diameter of the pin 589, the range of angular pivotable movement of the dog 586 about the pin 587 is limited.

In its normal condition, either with no tools or with tools other than taps carried in the spindle 45, the dog 586 is normally biased outwardly by means of a ball and spring mechanism 591 carried in the spindle dust collar 594 secured to the column 26 by bolts 595.

As shown in FIG. 16A, the flanged section 581 of the self-reversing tapping tool holder 582 carried in the spindle 45 is provided with slots 597 in its periphery. The flanged section of the tapping tool holder 581, which is the section that is held bodily stationary, extends radially overlapping the lock mechanism 580 a predetermined distance. As such, when the tapping tool holder 582 is inserted into the spindle 45, the flanged section 581 moves the dog 586 inwardly compressing the spring and ball mechanism 591. Upon initial rotation of the tool 582 at the start of a tapping operation, the flanged section 581 will rotate through an angular distance until one of the slots 597 is in radial alignment with the dog 586. With one of the slots 597 and the dog 586 in radial alignment, the dog is urged outwardly by means of the spring and ball mechanism 591 and engages one of the slots 597 to hold the flanged section stationary relative to spindle. With the flanged section 581 held stationary by the dog 586, the tapping tool holder 582 is in an operative condition for a tapping operation and is automatically reversed to withdraw a tap from a tapped hole without reversing the direction of spindle rotation.

In the process of inserting the tapping tool holder 582 into the spindle 45, it is possible that one of the radial slots 597 will be in exact radial alignment with the dog 586. In such case, the flanged section 581 would be immediately locked against rotation by the dog 586 engaging one of the slots 597 as the tool is secured in the collet. It will be apparent that with such immediate locking of the flanged section, the tapping tool is simultaneously in an operating condition without rotation of the flange.

When tools other than a tapping tool are carried by the spindle 45, the dog 586 of the lock mechanism 580 is spring biased outwardly by the spring and ball mechanism 591, as shown in FIG. 16. Although the dog is biased outwardly, it does not interfere with the operation of such other tools or with the operation of the tool change mechanism.

FIG. 17 illustrates a portion of the hydraulic circuit of FIG. 11 and incorporates a modification of the hydraulic circuit for the operation of the power cylinder 562 for tilting the movable track section 523 as well as a tool support 503 in contact therewith as shown in FIGS. 13, 14 and 15. As described hereinbefore with regard to the operation of the power actuator 562, it will be recalled that the power actuator tilts the toolholder 503 from the "indexable position" to the horizontal or tool change position, and likewise from the tool change position to the index position.

Movement of the tool support 503 from the index position to the tool change position occurs simultaneously with counterclockwise drum rotation. In a similar manner, the tool support 503 is moved from a tool change position to the "indexable position" during clockwise drum rotation. To effect actuation of the power actuator cylinder 562 to move the tool support from the index position to the tool change position simultaneously with the initiation of counterclockwise rotation of the drum 501, the hydraulic pressure supply line 569 is connected to the line 244 and to one end of the power cylinder 562. The opposite end of the cylinder 562 is connected to the line 243 by means of the hydraulic line 570.

As illustrated in FIG. 17, the power cylinder 562 is connected in parallel with the motor 215 that rotatably drives the drum 501. Thus, when the solenoid 373 is energized to supply pressure fluid to drive the motor 215 for initiating counterclockwise drum rotation, pressure fluid is simultaneously supplied to the power cylinder 562 urging its cooperating piston 610 outwardly tilting the movable track section as well as the tool support 503 from the "indexable position" to the tool change position. The hydraulic pressure fluid flows from the supply line 369 through the line 376 and the line 377 in the valve spool 374. From the valve line 377, pressure fluid flows through the line 244 to the motor 215 and simultaneously through the line 569 to the power cylinder 562. At the same time, the rod end of the piston 610 as well as the opposite side of the motor 215 are connected to drain. From the power cylinder 562, hydraulic fluid flows to drain via the lines 570 and 243, and through the line 378 in the valve spool 374 to the line 379 which is connected to the drain line 372. Exhaust fluid from the motor 215 flows through the lines 243, 378, 379 to the drain line 372.

To move the movable track section 523 and the tool support 503 from the tool change position to the index position simultaneously with initiation of clockwise rotation of the drum 501, the solenoid 466 is energized to supply pressure fluid to the motor 215 as well as the power cylinder 562. With the solenoid 466 energized moving the valve spool 374 rightwardly, pressure fluid flows from the supply line 369 through the line 376 and the line 468 in the valve spool. From the valve spool line 468, pressure fluid flows through the line 243 to the motor 215 and simultaneously through the line 570 to the power cylinder 562. Pressure fluid entering the cylinder 562 urges the piston 610 inwardly tilting the movable track section 523 as well as the tool support 503 from the tool change position to the retracted "indexable position." At the same time, the opposite side of the piston 610 is connected to drain via the lines 569 and 244, the line 469 of the valve spool 374 and the line 379 connected to a line 372. Likewise, exhaust fluid from the motor 215 is returned to drain via the lines 244, 469, 379 and 372.

Except for the modification to the hydraulic circuit described above, namely the power cylinder 562 connected in parallel with the motor 215, the remainder of the hydraulic circuit for operating the modified form of the invention is identical with that incorporated in the embodiment shown in FIG. 11.

The electrical control circuit for controlling the operation of the machine tool is shown diagrammatically in FIG. 18. In describing the operation of the electrical circuit, certain initial conditions will be assumed to best illustrate the various features of the circuit. Assume that a new set of tools has been placed in the storage drum 32 for the next machining cycle, and that the first or code identified tool to be used in the cycle is not located in the tool change station. Further, assume that the spindle does not contain a tool and that the power to the machine is turned off. With the power off, the collet is in a clamped or holding condition and the carrior 40 is retracted and in its horizontal "parked" position. To assist in describing the electrical circuit in FIG. 18, a vertical column of reference numerals provided with the suffix "x" is listed at the left of the drawing.

Power for operating the machine is derived from a three phase source represented by the lines L1, L2 and L3 which are connectable to energize a motor 365 through a master switch 626, fuses 627, and through normally open contact bars 628–M of a relay 628. The control circuit is energized by single phase current obtained from a transformer 630 which has its primary coil connected to the lines L2 and L3 with its secondary coil being connected to supply power of desired reduced voltage to energize conductors 632 and 633.

To energize both the control circuit and the pump motor 365, a start switch 634 is momentarily depressed thereby completing a circuit from a conductor 635 to the conductor 632, through a normally closed stop button switch 636, and then through the coil of the motor relay 628 to the energized control conductor 633. Conductor 633 is connected to the opposite side of the transformer 630, as shown in FIG. 18. Energization of the relay 628 moves the three contact bars 628–M upwardly completing a circuit energizing the pump motor 365. Another contact bar 628–A is simultaneously moved upwardly establishing a holding circuit between the lines 635 and 632 to retain the relay 628 and the control conductor energized. Simultaneously with the energization of relay 628, another relay 640 located rightward from 41X is energized which completes a circuit energizing the solenoid 373 to urge the drum 32 counterclockwise retaining one of the dogs 251 in abutting engagement with the pivotable stop lever 262, FIG. 5. The circuit for energizing the relay 640 is established from the energized conductor 632 via a conductor 641, and a branch conductor 642 to a wiper arm 643 of one bank of contacts 644 of a stepping switch generally identified by the reference numeral 645. With the wiper arms of the stepping switch 645 respectively engaging a last contact of respective banks of contacts, circuits are completed therethrough, as shown in FIG. 18. As is well known in the art, the respective wiper arms associated with the switch 645 are simultaneously stepped to sequentially disposed contacts of each bank as will hereinafter be extained. From the wiper arm 643, the circuit is completed via a vertical conductor 648 through the coil of relay 640, and a conductor 649 connected to the energized conductor 633. Energization of the relay 640 moves its associated contact bars 640A and 640B upwardly. Upward movement of the normally open contact bar 640A bridges conductors 651 and 652, completing a circuit from the conductor 632 energizing the solenoid 373 the opposite terminal of which is connected to the energized conductor 633. With these conditions established upon the energization of the control circuit, the control circuit is conditioned to carry out a tool change cycle upon selective indication from a manual switch.

To effect a tool change cycle, i.e., an interchange of tools between the drum 32 and the spindle 45, a tool change push button 653, located in line 29X, is momentarily depressed, energizing the coil of a tool change relay 654 to establish certain predetermined conditions in the circuit. The circuit for energizing the relay 654 is established from the conductor 632 via the momentarily depressed start button switch 653, through the coil of the relay 654 and a conductor 657 that is connected to the energized conductor 633. Energization of the relay 654 moves its associated normally open contact bar 654A upwardly to complete a holding circuit from the conductor 632 for the relay. Simultaneously, the associated contact bars 654B and 654C are also moved upwardly. Upward movement of the contact bar 654B completes a circuit from the conductor 632 via a conductor 658, closed contact bar 654B, and a conductor 659 to the coil of a relay 660 connected to the conductor 633. Energization of the relay 660 moves its associated contact bar 660A upwardly completing a circuit to energize the solenoid 386 to apply the spindle brake 187, FIG. 2. This circuit is completed from the conductor 632 via conductors 663, 664, 665, the now closed contact bar 660A and the solenoid 386 connected to the conductor 633.

Closure of the contact bar 654C completes a circuit from the conductor 632 via the now closed limit switch 643 and a conductor 666 to energize the coil of a relay 656. This circuit is completed via the now closed contact bar 654C, a conductor 670 and a conductor 671 connected to the conductor 657, which is connected to the conductor 633. Energization of the relay 656 closes its normally open contact bar 656A conditioning an electrical circuit for later use.

Another contact bar 654D associated with the relay 654 is moved upwardly completing a circuit energizing stepping switch relay 672. This circuit is completed from the conductor 632 via the horizontal conductor 641, vertical conductor 680, the wiper arm 675 and a conductor 681 to the now closed contact bar 654D. From the contact bar 654D, the circuit continues via conductors 682, 697 and 683, the normally closed contact bar 672A to the relay 672 which is connected to the conductor 657. Energization of the stepping switch relay 672 simultaneously moves its associated contact bar 672A upwardly interrupting the circuit from the conductor 683 the relay 672 thereby deenergizing the relay. Upon energization of the stepping switch coil 672 wiper arms 675, 643, 676 and 677 of the stepping switch 645 are advanced counterclockwise, as viewed in FIG. 18, to the first pin or contact in their respective banks of contacts of the switch. This stepping movement is effected in a well known manner by the operation of a spring returned ratchet and pawl mechanism, as schematically represented in FIG. 18.

As there shown, the respective wiper arms of the stepping switch are each engaging the last contact of respectively associated banks of contacts at the moment the cycle start button is momentarily depressed. From these contacts, it will be understood that stepping movement of the wiper arms always occurs in a counterclockwise direction to initiate the next sequential control step. Another normally closed contact bar 654E, associated with the relay 654 is moved upwardly to an open position having no effect on the electrical circuit at this time.

Upon the advancement of the wiper arms 675, 643, 676, and 677 to the first contact of each bank of contacts of the stepping switch 645, the circuits previously established through the wiper arms 675, and 643 are interrupted. Thus, the wiper arm 675 interrupts the circuit between conductors 680 and 681 preventing reenergization and further immediate stepping operation of the stepping switch 672 upon closure of its contact bar 672A. Likewise, the wiper arm 643 interrupts the circuit between conductors 642 and 648 to deenergize the relay 640. Deenergization of the relay 640 moves its associated contact bar 640A to the open position interrupting the circuit between conductors 651 and 652 thereby deenergizing the solenoid 373. Deenergization of solenoid 373 permits the valve spool 374, FIG. 11, to be returned to its central position terminating counterclockwise positioning of the drum 32 by the hydraulic motor 215. Simultaneously, the associated contact bar 640B is returned to its normally closed position conditioning an electrical circuit for subsequent energization.

With the wiper arms 675, 643, 676 and 677 simultaneously rotated to the first contact of their respective bank of contacts various different circuits are conditioned and established. With wiper arm 643 located at the first contact, a circuit is established energizing a relay 688 that, in turn, completes a circuit energizing the solenoid 466 to effect clockwise rotation of the drum 32. The circuit for energizing the relay 688 is established from the conductor 632 via conductors 641, 642, and through the wiper arm 643 to a conductor 689. From the conductor 689 the circuit continues via a normally closed contact bar 690C, which is associated with a latching relay 690, and through conductors 691 and 692 to the relay 688 which is connected to the conductor 633. Energization of the relay 688 moves its associated contact bar 688A upwardly completing a circuit from the conductor 663 and 664 through the now closed contact bar 688A to the solenoid 466 which is connected to the conductor 633.

It is emphasized that the wiper arms 675, 643, 676, and 677 advance simultaneously. Therefore, with the wiper arm 643 advanced to the first contact of its bank, the remaining wiper arms will likewise be advanced to the first contact of their respective bank of contacts. Since the first contact engaged by each of the wiper arms 676 and 677 are open contacts they will have no effect on the circuit. However, engagement of the wiper arm 675 with its respective first contact conditions a circuit for subsequent energization.

With the solenoid 466 energized, FIGS. 11 and 18, the drum 32 is rotatably driven in a clockwise direction until the first tool in the machining cycle, which is the tool having the elongated code identified toolholder body, actuates the code identified limit switch 286, conditioning a circuit for subsequently effecting final positioning of the first tool in the tool change station. Actuation of the limit switch 286 moves its associated contact bar to a closed position completing a circuit along horizontal line 24X from the conductor 632 to the conductor 671 energizing the latching coil of the latching relay 690. Energization of the latching relay 690 moves its associated contact bar 690B to a closed position, completing a circuit from the wiper arm 675 via a conductor 696, a conductor 697, and the conductor 683 and through the now closed contact bar 672A to energize the coil of the stepping switch relay 672. As described hereinbefore, energization of the stepping switch relay 672 moves its associated contact bar 672A upwardly interrupting the circuit between the conductor 683 and the relay, thereby effecting deenergization of the relay. Upon the deenergization of the stepping switch coil 672, the wiper arms 675, 643, 676 and 677 are simultaneously advanced in a counterclockwise direction to engage the second contact of their respective banks of contacts. Simultaneously with the closure of the contact bar 690B, the contact bar 690C associated with the latching relay 690 is moved to an open position interrupting the circuit between the conductors 689 and 691.

With all four wiper arms advanced to the second contact in their respective banks of contacts, the wiper arm 675 conditions a circuit for subsequent energization while the wiper arms 676 and 677 are connected to open contacts having no effect on the electrical circuit. The wiper arm 643 completes a circuit from the conductor 642 via a conductor 698, a normally closed contact bar 699C associated with the coil of a relay 699 and the conductor 692 to retain the relay 688 energized to maintain a continuation of clockwise rotation of the drum 32. The drum 32 will continue to rotate in a clockwise direction until the dog 251 associated with the code identified tool actuates the sequence control limit switch 271 to a closed position completing a circuit along line 7X from the conductor 632 to the conductor 671 energizing a relay 702. Energization of the relay 702 moves its associated contact bars 702A, 702B and 702C, to closed positions. Closure of the contact bar 702A establishes a circuit along horizontal line 8X from a conductor 632 via a conductor 703, the now closed contact bar 690A associated with the energized coil of the latching relay 690, and through the now closed contact bar 702A of energized relay 702 to energize the coil of relay 699 which is connected to the conductor 671. Closure of the contact bar 702B completes a circuit along horizontal lines 16X and 17X to energize a relay 707. This circuit is established from the conductor 632 via a conductor 708, through the normally closed contact bar 640B to the vertical conductor 709. From the conductor 709, the circuit continues through the now closed contact bar 702B to energize the coil of the relay 707 and thence via a conductor 710 connected to the conductor 671.

Closure of the contact bar 702C completes a circuit from the wiper arm 675 through a conductor 711, the now closed contact bar 702C and a conductor 712 to the conductor 697. From the conductor 697 the circuit is completely through the conductor 683 and the now closed contact bar 672A energizing the relay 672 which is connected to the conductor 657.

Prior to stepping movement of the switch wiper arms from the second to the third contacts, energization of the relay 699 moves its associated normally open contact bars 699A and 699B to a closed position and the normally closed contact bar 699C to an open position. Closure of the contact bar 699A bridges conductors 715 and 716 establishing a seal-in holding circuit for the relay 699. Closure of the contact bar 699B completes a parallel seal-in circuit from the conductor 711 through a conductor 717 and a conductor 718 to the conductor 697; opening movement of the contact bar 699C interrupts the circuit between conductors 698 and 692 deenergizing the relay 688 which in turn terminates clockwise rotation of the drum 32.

Energization of the relay 707 moves its normally open contact bars 707A and 707B to closed position. Closure of the contact bar 707A establishes a holding circuit for the relay 707 from the vertical conductor 709 through the closed contact bar 707A to the relay 707. Closure of the contact bar 707B conditions the electrical circiut along horizontal line 16X for subsequent energization since energization of this circuit is not possible at this time because the lower contact bar of the limit switch 271 is actuated to an open position.

With the clockwise rotation of the drum already stopped upon deenergization of relay 688, energization of the stepping switch relay 672 moves its associated contact bar 672A upwardly interrupting the circuit between the conductor 683 and the relay 672. Upon momentary energization and deenigization of the coil of the relay 672, the four wiper arms of the stepping switch 645 are simultaneously advanced to engage the third contact of their respective banks of contacts.

With the wiper arm 643 engaging the third contact of its respective bank, a circuit is completed to energize the relay 640 to effect counterclockwise rotation of the drum 32. This circuit is established from the wiper arm 643 through a conductor 722, the conductor 648, the coil of the relay 640 and the conductor 649 connected to the energized conductor 633. Energization of the relay 640 moves its associated contact bar 640A to a closed position and the contact bar 640B to an open position. Opening the contact bar 640B interrupts the circuit along horizontal line 16X effecting the deenergization of the relay 707 in horizontal line 17X. Deenergization of the relay 707 moves its associated normally open contact bars 707A and 707B to the open position.

Closure of the normally open contact bar 640A bridges the conductors 651 and 652, completing a circuit along horizontal line 20X to energize the solenoid 373. Energization of the solenoid 373, FIGS. 11 and 18, effects counterclockwise rotation of the drum 32 moving the dog 251, FIG. 5, into abutting positioning engagement with the lever 262 thereby stopping the counterclockwise drum rotation.

With the wiper arm 676 engaging the third contact of its respective bank of contacts, a circuit is completed energizing a relay 723 urging the carrier 40, FIG. 2, inwardly relative to the frame 28. This circuit is established from the conductor 632 via the conductor 641, line 48X, and a vertical conductor 724 to the wiper arm 676. From the wiper arm 676, a circuit continues via a conductor 725 and a conductor 726 connected to the coil of the relay 723. This circuit is completed from the relay 723 through a normally closed contact bar 728A associated with a relay 728, and a conductor 729 connected to the conductor 633. Energization of the relay 723 moves its associated normally open contact bar 723A to a closed position and its normally closed contact bars 723B and 723C to on open position.

Closure of the contact bar 723A completes a circuit from the vertical conductor 664 along the horizontal line 26X through the now closed contact bar 723A to the solenoid 399 connected to the conductor 633. Energization of the solenoid 399, FIGS. 11 and 18, effects a flow of hydrualic pressure fluid urging the piston 402 connected to the carrier 40 inwardly prior to the carrier rotating to engage a tool. Opening of the contact bars 723B and 723C has no effect on the control circuit at this time.

With the wiper arm 677 engaging contact 3 of its respective bank of contacts, a circuit is completed energizing a relay 732. This circuit is completed from the conductor 632 through the conductor 641, line 48X, and a conductor 733 to the wiper arm 677. From the wiper arm 677, the circuit continues via a conductor 734 to the coil of the relay 732 which is connected to the conductor 633. Energization of the relay 732 moves its associated contact bar 732A upwardly to a closed position completing a circuit from conductor 664 along the horizontal line 24X to energize the solenoid 410 connected to the conductor 633. Energization of the solenoid 410, FIGS. 18 and 11, effects a 90° clockwise rotation of the carrier 40 to its vertical tool engaging position As the carrier 40 rotates from the horizontal position to a vertical position grasping the tool in the tool change station, the discs 291 and 292 likewise rotate with the shaft 44 and sleeve 101, FIGS. 2 and 7. When the carrier 40 is in the vertical position, the limit switch 298 is actuated by one dog 293 or 294. Since tool engaging rotation is always in a clockwise direction, and since the cam dogs 293 and 294 are spaced 180° apart, it will b apparent that the dogs will operate to actuate the contrc switch 298 on successive alternate tool changing cycle: Actuation of the limit switch 298 moves its associated cor tact bar 298U, line 12X, to an open position and it normally open contact bar 298L to a closed position er ergizing the relay 738. Closure of the contact bar 298L establishes a circuit from the conductor 632 through the now closed contact bar 298L and a conductor 737, line 21X, to a relay 738. From the relay 738, the circuit is completed through a conductor 739 and conductors 671 and 657 to the conductor 633.

Energization of the relay 738 moves its normally open contact bars 738A, 738B and 738C to closed positions. Closure of the contact bars 738A and 738B conditions a portion of the circuit for subsequent energization. Closure of the contact bar 738C completes a circuit from the wiper arm 675, engaging a third contact, through a conductor 740, the now closed contact bar 738C, and conductors 697 and 683 to energize the stepping switch relay 672. Energization of the stepping switch relay 672 moves its associated contact bar 672A upwardly interrupting the circuit from the conductor 683 to the relay 672 effecting deenergization of the relay. Upon the deenergization of the relay 672, the four wiper arms of the stepping switch 645 are respectively advanced to the fourth contact of their respective banks of contacts.

With the wiper arm 643 engaging its fourth contact, a circuit is maintained from the wiper arm 643 through the fourth contact and the conductors 722 and 648 to retain the relay 640 energized which, as explained above, completes a circuit for urging the drum counterclockwise. Since the wiper arm 677 engages an open contact at the fourth position the circuit to the relay 732 previously established through the third contact is interrupted. Interruption of the circuit deenergizes the relay 732 moving its associated contact bar 732A to the open position which, in turn, deenergizes the solenoid 410. With the deenergization of the solenoid 410, the carrier 40 is maintained in a vertical position engaging only one tool, namely, the tool in the tool change station, since it was assumed at the beginning of this cycle that the spindle did not initially carry a tool.

With the wiper arm 676 advanced to the fourth contact of its bank of contacts, the circuit to the relay 723 is interrupted deenergizing the relay moving its associated contact bar 723A to the open position, interrupting the circuit to the solenoid 399 and thereby terminating the hydraulic pressure fluid urging the piston 402 inwardly. Deenergization of the relay 723 likewise effects movement of its associated contact bar 723B to closed position establishing a circuit along horizontal line 3X for energizing a relay 744 to release the collet 194, in preparation for automatic withdrawal of a tool that may be clamped therein. This circuit is completed from the conductor 632 via a conductor 745, the now closed contact bar 738A and the now closed contact bar 723B to the relay 744 which is connected to the conductor 633.

Energization of the relay 744 moves its associated contact bar 744A to the closed position establishing a condition for a holding circuit for the relay along horizontal lines 1X and 2X. This holding circuit is completed, after the carrier moves outwardly, from the conductor 632 through the subsequently closed contact bar 656B and the now closed contact bar 744A to the relay 744. In the solenoid circuit, an associated contact bar 744B is moved to the closed position completing a circuit from the conductor 664, through the contact bar 744B to the solenoid 436 which is connected to the conductor 633. Energization of the solenoid 436, FIG. 11, moves the valve spool 437 leftwardly supplying pressure fluid to the power actuator 198 to release the collet 194. As mentioned hereinbefore, the collet must be actuated to release the tool, before the tool can be extracted therefrom by means of the axially outward movement of the carrier 40. Since our initial conditions assume that the spindle did not contain a tool, the release of the collet becomes important in the subsequent changing of tools. Irrespective of whether or not a tool is carried in the spindle, it will be apparent from the electrical circuit, FIG. 18, that the collet is released simultaneously with the outward movement of the tool carrier 40. In addition, the contact bar 723C is moved to the closed position conditioning a circuit for subsequently energizing the relay 728.

Engagement of the wiper arm 676 with the fourth contact completes a circuit from the wiper arm 676 via a conductor 743, the now closed contact bar 723C, and to the coil of the relay 728 connected to the conductor 633. Energization of the relay 728 moves its associated contact bar 728A to the open position interrupting the circuit between the relay 723 and the conductor 729 to prevent energization of the relay 723. Simultaneously, an associated contact bar 728B is moved to the closed position establishing a circuit from conductor 664 along horizontal line 25X to energize the solenoid 453. Energization of the solenoid 453, FIG. 11, moves the valve spool 463 rightwardly to supply pressure fluid to the power actuator 122 urging the piston 402 as well as the carrier 40 outwardly to extract or withdraw the tool from the tool support 33.

Upon axial outward movement of the carrier 40 together with the shaft 44 during the tool withdrawal stroke, the dog 341 moves out of engagement with the limit switch 343, thereby deactuating it. Deactuation of the limit switch 343 to its normally open position interrupts the circuit along horizontal line 4X deenergizing the relay 656. With the deenergization of the relay 656, its associated contact bar 656A is moved to the open position and its associated contact bar 656B is moved to normally closed position completing the holding circuit for retaining the previously energized coil of the relay 744 in its energized condition until the interchanged tools are reinserted in their respective sockets.

As soon as the carrier 40 reaches its axially outward limit of movement, the dog 345 is moved axially outward with the shaft 44 to actuate the limit switch 346, in horizontal line 13X, effecting energization of a relay 750. Actuation of the limit switch 346 to closed position completes a circuit from the conductor 632 through the now closed contact bar of the switch 346 and a conductor 748 to the now closed contact bar 738B. From the contact bar 738B, the circuit continues through to the coil of the relay 750 connected to the conductor 671, and the conductor 657 connected to the conductor 633.

Energization of the relay 750 moves its associated contacts bars 750A, 750B and 750C to closed position. Closure of the contact bar 750A has no effect on the circuit at this time, since the contact bar 298U is in the open position. Closure of the associated contact bar 750B establishes a holding circuit for the relay 750 from the conductor 748 through the now closed contact bar 750B to the coil of the relay 750. Closure of the associated contact bar 750C completes a circuit from the wiper arm 675 through a conductor 751 and the now closed contact bar 750C and conductors 697 and 683 to energize the stepping switch relay 672. With the completion of this circuit, as hereinbefore explained, the four wiper arms of the stepping switch 645 are advanced to the fifth contact of their respective banks of contacts.

With the wiper arm 643 in engagement with the fifth contact in its bank of contacts, the circuit energizing the relay 640 is maintained through conductors 722, 648 and 649 to retain the drum urged in a counterclockwise direction. Engagement of the wiper arm 676 with the fifth contact in its respective bank of contacts maintains the circuit established through conductor 743 and the normally closed contact 723C to retain the relay 728 enegerized which maintains the carrier 40 urged axially outwardly. With the wiper arm 677 in engagement with the fifth contact of its bank of contacts, a circuit is completed through the wiper arm, a conductor 753 and conductor 734 to energize the relay 732 which is connected at its opposite end to the conductor 633. Energization of the relay 732, as described hereinbefore, moves its associated contact bar 732A to a closed position completing a circuit along horizontal line 24X to energize the solenoid 410 to effect 180° clockwise rotation of the carrier 40, as viewed in FIG. 1. As the carrier 40 begins to rotate in a clockwise direction to transfer the tool from the drum to the spindle, the dog, either dog 293 or 294, actuating the limit switch 298 moves out of engagement with the limit switch as will be apparent by viewing FIG. 7. Upon deactuation of the limit switch 298, its associated contact bar 298L, horizontal line 21X, moves to its normally open position, interrupting the circuit between the conductor 632 and the conductor 737 to deenergize the relay 738. Deenergization of the relay 738 moves its associated contact bars 738A, 738B and 738C to open positions. Opening of the contact bars 738A and 738B interrupts energized circuits which are in parallel with other holding circuits and thereby have no immediate effect on the electrical circuit. Opening of the contact bar 738C interrupts a non-energized circuit between conductor 740 and the conductor 697 and likewise has no immediate effect upon the electrical circuit.

Simultaneously with the opening of the contact bar 298L of limit switch 298, its associated contact bar 298U, horizontal line 12X, is returned to normally closed position establishing a circuit from the conductor 632 through the now closed contact bar and a conductor 754, the closed contact bar 750A to the coil of a relay 755 that is connected to the energized conductor 671. Energization of the relay 755 closes both its associated contact bars 755A and 755B. Closure of the contact bar 755A establishes a holding circuit for the relay 755 from conductor 632 through a conductor 756, horizontal line 11X and a conductor 757 to the conductor 754. The holding circuit continues to relay 755 and the conductor 671. Closure of the contact bar 755B conditions an electrical circuit for subsequent energization of a relay 759 via conductors 760 and 761 and horizontal line 21X.

Upon completion of a 180° clockwise rotation of the carrier 40 for positioning the respective tool or tools in alignment with the spindle and the drum, the limit switch 298 is reactuated by one or another of the dogs 293 or 294. Reactuation of the limit switch 298 moves the associated contact bar 298U to the open position interrupting the circuit in horizontal line 12X without any immediate effect since the relay 755 is retained in an energized condition through the holding circuit beginning in horizontal line 11X. Simultaneously, the associated contact bar 298L, horizontal line 21X, is moved to closed position completing a circuit to again energize the relay 738 as well as the relay 759. The circuit for energizing the relay 738 is established from conductor 632 through the now closed contact bar 298L, horizontal line 21X, and conductor 737 to the coil of the relay 738. From the relay 738, the circuit continues via conductor 739, and conductors 671 and 657 to the conductor 733. Energization of the relay 738 moves its associated contact bars 738A, 738B and 738C to the closed position. Closure of the contact bar 738A completes a parallel circuit with the holding circuit in horizontal line 1X and has no immediate effect on the circuit. Likewise, closure of the contact bar 738B completes a circuit in parallel with the holding circuit completed through the now closed contact bar 750B, horizontal line 15X, and has no immediate effect upon the electrical circuit. Closure of the contact bar 738C conditions a non-energized circuit, horizontal line 37X, for subsequent energization.

The relay 759 is energized by means of a circuit completed from the conductor 737 through the conductors 760 and 761, and the now closed contact bar 755B to the conductor 671. Energization of the relay 759 moves its associated contact bar 759A, horizontal line 35X, to a closed position completing a circuit from the wiper arm 675, through a conductor 762, a conductor 763, and conductors 697 and 683 to energize the steping switch relay 672. Upon energization of the stepping switch 672 through the opening of its associated contact bar 672A, all four wiper arms of the stepping switch 645 are advanced to the sixth contact of their respective bank of contacts.

With the wiper arm 643 engaging the sixth contact in its bank, a circuit is maintained for energizing the relay 640 through conductors 722, 648 and conductor 649 connected to the conductor 633. Advancement of the wiper arm 677 to the sixth contact in its respective bank of contacts produces no effect in the circuit since the sixth contact is an open contact.

With the advancement of the wiper arm 676 from the fifth contact to the sixth contact in its bank of contacts, the circuit energizing the relay 728 is interrupted deenergizing the relay which in turn effects deenergization of the solenoid 453. Deenergization of the solenoid 453 terminates the flow of pressure fluid, FIG. 11, to the power actuator 122 for urging the carrier 40 axially outward. In addition, the contact bar 728A associated with the relay 728 is moved to its normally closed position conditioning a circuit for subsequent energization of the relay 723.

Engagement of the wiper arm 676 with the sixth contact in its respective bank of contacts completes the circuit from the wiper arm 676 to the conductor 726 for energizing the relay 723. From the coil of the relay 723, the circuit is completed through the now closed contact bar 728A and conductor 729 connected to the conductor 733. Energization of the relay 723 moves the associated contact bar 723A to closed position, completing a circuit from conductor 664 along the horizontal line 26X through the now closed contact bar 123A for energizing the solenoid 399 having its opposite end connected to the conductor 633. Energization of the solenoid 399, FIGS. 11 and 18, moves the valve spool 403 leftwardly, connecting hydraulic pressure fluid to the power actuator 122 to move the carrier 40 axially inward. As described hereinbefore, axially inward movement of the carrier 40 effects simultaneous insertion of the interchanged tools into the spindle and the tool support of the drum respectively. However, since it was initially assumed that the spindle did not carry a tool at the commencement of this cycle, axially inward movement of the carrier at this time effects insertion of a tool into the spindle 45. Thus, no tool is being inserted in the tool support 33 of the drum 32. Another contact bar 723B is moved to the open position upon the energization of relay 723 interrupting the circuit along horizontal line 3X to the coil of the relay 744. Opening of the contact bar 723B has no effect on the relay 744 since it is retained energized by means of the holding circuit beginning in the horizontal line 1X. It will be apparent that, since the limit switch 343 is deactuated at this time its contact bar will be in the open position and the relay 656 is deenergized.

As the carrier 40 moves axially inward, the dog 345 moves out of engagement with the limit switch 346 thereby deactuating it and moving its contact bar, horizontal line 13X to open position. Deactuation of the limit switch 346 interrupts the circuit between conductors 632 and 748, deenergizing the relay 750. With the deenergization of the relay 750, its associated contact bars 750A, 750B and 750C are moved to normally open position. Movement of the contact bar 750A to open position interrupts the circuit energizing the relay 755. Deenergization of the relay 755 moves its associated contact bars 755A and 755B to their normally open positions. With the contact bar 755B in the open position the circuit between conductors 761 and 671, horizontal line 22X, is interrupted to deenergize the relay 759. Deenergization of the relay 759 moves its associatde contact bar 759A to its normally open position interrupting the circuit between conductors 762 and 763. The opening of the contact bar 759A has no immediate effect on the circuit since the conductors 762 and 763 are not energized at this time.

Movement of the contact bar 750B to the open position, as well as movement of the contact bar 750C to open position have no immediate effect in their respective portions of the control circuit since each contact bar interrupts a non-energized circuit at this time.

As the carrier 40 as well as the shaft 44 completes its axially inward movement, the dog 341 actuates the limit switch 343, as best shown in FIG. 2. Actuation of the limit switch 343, horizontal line 4X, moves the contact bar to the closed position, completing a circuit from conductor 632 through the contact bar and conductor 666 to energize the relay 656. The circuit is completed via the now closed contact bar 654C and conductor 670 to the conductor 671. Energization of the relay 657 moves its associated contact bar 656B to the open position, interrupting the holding circuit along horizontal line 2X, thereby effecting deenergization of the relay 744, in line 3X. Deenergization of the relay 744 moves both of its associated contact bars 744A and 744B to open positions. Movement of the contact bar 744A to open position interrupts the now deenergized holding circuit in horizontal line 1X, while movement of the contact bar 744B interrupts the circuit from conductor 644 to the solenoid 436, horizontal line 22X, effecting deenergization of the solenoid. Deenergization of the solenoid 436 releases hydraulic pressure from the power actuator 198 permitting the spring 202, FIG. 2, to draw the collet 194 inwardly securely gripping the tool now inserted therein.

Simultaneously with the opening movement of the contact bar 656B of energized relay 656, the associated contact bar 656A is moved to the closed position completing circuit from the wiper arm 675 through a conductor 665, the now closed contact bar 657A and a conductor 666 to the conductor 697. From the conductor 697, the circuit continues via the conductor 683 and the normally closed contact bar 672A to the stepping switch relay 672 energizing it.

Energization of the relay 672 moves its contact bar 672A upwardly, thereby effecting deenergization of the relay 672. Upon deenergization of the relay 672 four wiper arms of the stepping switch 645 are advanced to the seventh contact in their respective banks of contacts.

Engagement of the wiper arm 643 with the seventh contact in its bank of contacts completes a circuit through conductors 722 and 648 to retain the relay 640 energized, which maintains the drum 32 urged in counterclockwise direction. The circuit is completed from the relay 640 through the conductor 649 to the conductor 633. With the wiper arm 676 engaging the seventh contact of its respective bank of contacts, a circuit is established from the wiper arm 676 via the conductor 726 to retain the relay 723 energized. As was described hereinbefore, the circuit is completed from the relay 723 via the now closed contact bar 728A and conductor 729 connected to the conductors 633. Energization of relay 723 maintains the solenoid 399 energized for dynamically urging the carrier 40 inwardly during return counterclockwise movement to parked position.

With the wiper arm 677 engaging the seventh contact bar of its respective bank of contacts, a circuit is established from the wiper arm 677 through a conductor 768 to energize a relay 769. The coil of the relay 769 is connected at its opposite terminal to the conductor 633. Energization of the relay 769 moves its associated contact bar 769A to a closed position completing a circuit from the conductor 664 along horizontal line 27X to energize the solenoid 460 which is connected to the conductor 633. Energization of the solenoid 460 moves the valve spool 411 leftwardly, FIG. 11, supplying hydraulic pressure fluid to the motor 112 thereby rotating the carrier 40 a distance of 90° in counterclockwise direction to a "parked" position.

As the carrier 40, the shaft 44, and the cam discs 291 and 292 shown in FIG. 2 are rotated 90° in a counterclockwise direction, the limit switch 298 is deactuated. Deactuation of the limit switch 298 moves its associated contact bar 298L, horizonal line 21X, to open position, interrupting the circuit from the conductor 632 to the conductor 737, thereby deenergizing the relay 738. Deenergization of the relay 738 moves its associated contact bars 738A, 738B, and 738C, to their normally open positions. In each case, the opening of the contact bars 738A, 738B and 738C has no immediate effect on the circuit at this time other than interrupting conditioned circuits.

Simultaneously with the opening of the contact bar 298L, the associated contact bar 298U, line 12X, is moved to closed position, conditioning a circuit from the conductor 632 to the conductor 754. Since the relay 750 is deenergized at this time, closure of the contact bar 298U has no further effect upon the circuit.

As the carrier 40 completes its counterclockwise rotation to the horizontal "parked" position, as illustrated in phantom lines in FIG. 1, the limit switch 299, horizontal line 32X, is actuated to a closed position by one of the dogs 295 or 296, as best shown in FIG. 7. With the wiper arm 675 engaging the seventh contact, actuation of the limit switch 299 completes a circuit along a conductor 771 to energize a relay 772. A circuit is completed via the now closed contact bar of the limit switch 299 and a conductor 773 connected to the conductor 633. Energization of the relay 772 moves its associated contact bar 772A to the open position interrupting the circuit between the relay 654 and the conductor 657, thereby deenergizing the relay 654. Deenergization of the relay 654 moves its associated contact bars 654A, 654B, 654C, and 654D to open positions. Simultaneously, the associated contact bar 654E is moved to the normally closed position.

Movement of the contact bar 654A to open position interrupts the now deenergized holding circuit for the coil of the relay 654 in horizontal line 26X. Movement of the associated contact bar 654B to open position interrupts the circuit between conductors 658 and 659 effecting deenergization of the relay 660. With the deenergization of the relay 660, its associated contact bar 660A is moved to the open position interrupting a circuit from the conductor 665 to the solenoid 386. Deenergization of the solenoid 386 releases the spindle brake 187, as shown in FIG. 2, thereby permitting the spindle to be rotatably driven.

Movement of the contact bar 654C to open position interrupts the circuit between the relay 656 and the conductor 670 effecting deenergization of the relay 656. With the deenergization of the relay 656, its associated contact bar 656A is moved to open position and does not have any immediate effect upon the circuit since it interrupts a non-energized circuit. Movement of the contact bar 654D to its normally open position interrupts the previously conditioned circuit in horizontal line 30X between conductors 681 and 682. Again, since this circuit is currently not energized, opening of the contact bar 654D has no immediate effect upon the rest of the control circuit.

Movement of the contact bar 654E to its normally closed position completes a circuit from the conductor 771 through a conductor 776, the now closed contact bar 654E and a conductor 777 connected to the conductor 697. From the conductor 697 the circuit continues to the conductor 683 and the now closed contact bar 672A to the relay 672 energizing the relay. Again, as described hereinbefore, the relay 672 advances the wiper arms of the stepping switch 645 upon deenergization of the relay effected by the upward movement of the contact bar 672A.

Upon the deenergization of the relay 672, the four wiper arms of the stepping switch 645 advance to the eighth contact in their respective banks of contacts of the stepping switch. Engagement of the wiper arm 676 with the eighth contact of its bank has no effect on the circuit since it is an open contact. Likewise, engagement of the wiper arm 677 with its respective eighth contact has no effect on the circuit either since it is an open contact.

With the advancement of the wiper arm 643 from the seventh contact to the eighth contact of its respective bank, the circuit for energizing the relay 640 is interrupted thereby deenergizing the relay. Deenergization of the relay 640 moves its associated contact bar 640A to the open position interrupting the circuit between conductors 651 and 652, horizontal line 20X, effecting deenergization of the solenoid 373. With the deenergization of the solenoid 373, the valve spool 374 is moved to its central position, FIG. 11, terminating counterclockwise urging of the drum 32. Simultaneously, the associated contact bar 640B is moved to the closed position conditioning the circuit in horizontal line 16X.

Engagement of the wiper arm 643 with the eighth contact of its respective bank of contacts completes a circuit from the wiper arm 643 through a conductor 770 and conductors 691 and 692 to the relay 688 to energize it. The circuit is completed from the relay 688 via a conductor in horizontal line 36X connected to the conductor 633. Energization of the relay 688 moves its associated contact bar 688A to the closed position completing a circuit from the conductor 663 through the now closed contact bar 688A to the solenoid 466 energizing it.

Energization of the solenoid 466 moves the valve spool 374, FIG. 11, rightwardly supplying pressure fluid to the motor 215 to sequentially rotate the drum 32 clockwise for placing the next sequentially disposed tool in the tool change station 38.

During a sequential indexing cycle, two successively positioned dogs 251 actuate the switch 271. Actuation of the switch 271 by the first dog (now shown engaging lever arm 262) has no effect on clockwise drum rotation which continues, causing the next adjacent dog to trip the lever 262 and thence actuate the switch 271 a second time. The second actuation of the switch 271 by the next succeeding dog 251 terminates clockwise rotation of the drum and initiates the counterclockwise rotation of the drum to urge that dog into abutting engagement with the lever 262. Thus, as the drum indexably rotates clockwise to place the next tool in the tool change station, the dog 251, which is now shown engaging the lever 262, in FIG. 3, actuates the limit switch 271, FIGS. 3 and 5. In the electrical circuit in FIG. 18, actuation of the limit switch 271 moves the associated contact bar 271L to the open position with no immediate effect upon the electrical circuit. Simultaneously, the associated contact bar 271U is moved to the closed position completing a circuit along horizontal line 7X energizing the relay 702. Energization of the relay 702 moves its associated contact bars 702A, 702B and 702C to the closed position. Closure of the contact bar 702C has no immediate effect upon the circuit since it now bridges deenergized conductors 711 and 712. Closure of the contact bar 702A completes a circuit from conductor 632 along horizontal line 8X through conductor 703 and the now closed contact bar 690A to energize the relay 699. Energization of the relay 699 moves its associated contact bars 699A and 699B to closed position and the contact bar 699C to open position. Closure of the contact bar 699A completes a holding circuit for the relay 699 to retain it energized. Closure of the contact bar 699B and opening of the contact bar 699C respectively have no effect upon the control circuit, since each is respectively in a now deenergized circuit.

Closure of the contact bar 702B completes a circuit along horizontal line 17X from conductor 709 energizing the relay 707 connected to the conductor 671 through the conductor 710. Energization of the relay 707 moves its associated contact bars 707A and 707B to closed position. With the movement of the contact bar 707A to closed position, a holding circuit is established from the conductor 632 through the conductor 708, the now closed contact bar 640B, conductor 709 and the now closed contact bar 707A to the coil of the relay 707. Closure of the contact bar 707B conditions a circuit along horizontal line 16X for the subsequent energization of a relay 780.

Upon continued clockwise rotation of the drum 32 the dog 251 moves out of engagement with the limit switch 271, thereby deactuating the limit switch. Deactuation of the limit switch 271 moves its associated contact bar 271U to open position effecting deenergization of the relay 702. Deenergization of the relay 702 moves its associated contact bars 702A, 702B and 702C to normally open position. Opening the contact bars 702A and 702B respectively interrupt parallel circuits that had respectively been established to energize relays 699 and 707 However, in each case, the parallel circuit interrupted had no effect on the continued energization of the respective relays 699 and 707, which are held in energized closed position. Movement of the contact bar 702C to the open position likewise has no immediate effect upon the electrical control circuit.

Closure of the associated contact bar 271L of the limit switch 271 completes a circuit along horizontal line 16X energizing the relay 780. This circuit is completed from the conductor 632 through the conductor 708, the now closed contact bar 640B, and the now closed contact bar 271L to the now closed contact bar 707B. From the contact bar 707B, the circuit continues through the relay 780 and a conductor 781 to the conductor 671. Energization of the relay 780 moves both of its associated contact bars 780A and 780B to the closed position. Closure of the contact bar 780A establishes a holding circuit for the relay 780, maintaining it energized upon subsequent opening of the contact bar 271L. Closure of the contact bar 780B has no effect at this time because the contact 271U in line 7X is in open position. Thus, the drum 3 continues to rotate in a clockwise direction until the succeeding dog 251 actuates the switch 271 the second time and moves the contact bar 271U to a closed position Upon this occurrence circuit is established from conductor 632 and thence along horizontal line 7X through th now closed contact bar 271L. From the contact bar 271L the circuit continues through a conductor 785, through the now closed contact bar 780B and the coil of the relay 784, which is connected to the conductor 671. Energization of the relay 784 moves its associated contact bar 784A, horizontal line 31X, to the closed position bridging conductors 786 and 787, completing a circuit from the wiper arm 675 through the conductor 683 and the now closed contact bar 672A to energize the relay 672. Upon energization of the stepping switch relay 672, its associated contact bar 672A is moved upwardly interrupting the circuit energizing the relay 672 and thereby deenergizing it.

Upon the deenergization of the relay 672, four wipe arms of the stepping switch 645 are advanced from th eighth contact to the ninth contact of their respectiv banks of contacts. Engagement of the wiper arms 67 and 677 with their respective ninth contact produces n effect in the electrical control circuit since their respec tive contacts are open contacts. With the wiper arr 675 engaging the ninth contact, a circuit is conditione for subsequent energization.

With the advancement of the wiper arm 643 from th eighth contact to the ninth contact, the circuit between the wiper arm and the conductor 770 is interrupted effecting deenergization of the relay 688 in horizontal lir 36X. Deenergization of the relay 688 moves its associated contact bar 688A to open position, deenergizir the solenoid 466 which in turn terminates clockwi rotation of the drum 32. Upon the engagement of th wiper arm 643 with the ninth contact, a circuit is com pleted from the wiper arm through the conductor 648 energize the relay 640, the circuit continuing throug the conductor 649 to the conductor 633. With the ene gization of the relay 640, its associated contact bar 640 is moved to the closed position and the contact bar 640 is moved to the open position. Movement of the conta bar 640B to open position interrupts the circuit alor horizontal line 16X effecting deenergization of the rela 707 and 780. Deenergization of the relay 780 in tu oves its associated contact bar 780B to open position
fecting deenergization of the relay 734.

Movement of the contact bar 640A to closed position
:idges conductors 651 and 652 completing a circuit
ong horizontal line 20X to energize the solenoid 373.
nergization of the solenoid 373 moves the valve spool
'4, FIG. 11, leftwardly effecting counterclockwise ro-
tion of the drum which, in turn, moves the same dog
51, which had actuated the sequence control switch
71 the second time, into abutting positioning engage-
ent with the lever 262. As the drum rotates counter-
ockwise, the dog 251 is moved out of engagement with
e limit switch 271. Deactuation of the limit switch 271
oves its associated contact bar 271U to the open posi-
m interrupting the circuit along horizontal line 7X
id deenergizing the relay 702 moving its associated con-
ct bars 702A, 702B and 702C to the open position.
multaneously, the contact bar 271L, horizontal line
iX, is moved to the closed position but has no effect
 the circuit at this time since the contact bar 640B is
 the open position. With the engagement of the dog
:1 against the lever 262, the second tool in the tool
ange cycle is now located in the tool change station
 and ready to be extracted upon initiation of a subse-
ient tool change cycle.

At this point, the tool change cycle for removing the
st tool in the machining cycle from the drum and plac-
; it in the spindle 41 is completed, and the second tool
 the machining cycle is positioned in the tool change
ition 38. As hereinbefore explained, the first tool
ange in a new machining cycle is initiated by depress-
; the tool change cycle start button 653. The first
ol change cycle includes the following principal func-
ns: (1) rotating the drum to place the first, or code
entified tool in the change station, (2) transferring the
le identified tool into the empty spindle, and (3) se-
entially indexing the drum to advance the second tool
o the change station in readiness for the next tool
ange. The second, and all subsequent tool changes of
particular machine program are likewise initiated by
oressing the start button switch 653. The second
d subsequent tool changes of the same program, how-
:r, include only two principal functions: (1) inter-
anging the tool in the spindle with the tool in the
inge station, and (2) sequentially index the drum to
sition the next succeeding tool in the change station.
To effect a tool change cycle placing the second tool
 the machining cycle in the spindle 41 and transferring
 first or code identified tool currently in the spindle to
 tool support 33 in the tool storage drum 32, the tool
inge switch 653, horizontal line 29X, is depressed
npleting a circuit from the conductor 632 to energize
 relay 654. From the conductor 632 the circuit con-
ies through the now closed contact bar of switch 653,
 coil of the relay 654 and the conductor 657 to the
iductor 633. With the energization of the relay 654,
 associated contact bars 654A, 654B, 654C and 654D
 moved to closed positions and the contact bar 654E
 moved to the open position. With the closure of
 contact bar 654A a holding circuit is established from
iductor 632 along the horizontal line 26X to retain
 relay 654 energized upon the release of the push
ton switch 653. Closure of the contact bar 654B
lges the conductors 658 and 659, in horizontal line
, completing a circuit energizing the relay 660 which
urn moves its associated contact bar 660A to a closed
ition completing a circuit to energize the solenoid
. Energization of the solenoid 386 applies the spin-
brake 187, FIG. 2. Closure of the contact bar 654C
ipletes a circuit along horizontal line 4X from the
ductor 632 through the now closed contact bar of
tch 343 and conductors 666 and 670 to energize the
ly 656. Energization of the relay 656 moves its as-
iated contact bar 656A to closed position, but has no
nediate effect on the electrical control circuit since the conductors 765 and 766 are deenergized at this time.

With the closure of the contact bar 654D, the circuit
is completed from the wiper arm 675 to conductor 681
and conductors 682 and 683 and the now closed contact
bar 672A to energize the relay 672. As described here-
inbefore, energization of the relay 672 moves its contact
bar 672A upwardly interrupting the circuit and thereby
deenergizing the relay 672. Upon the deenergization of
the relay 672 all four wiper arms 675, 643, 676 and 677
of the stepping switch 645 are advanced counterclock-
wise, as viewed in FIG. 18, placing each wiper arm in
contact with the first contact of its respective bank of
contacts.

Since the first contacts in the respective bank of con-
tacts engaged by the wiper arms 676 and 677 are open
contacts, engagement by the wiper arms will have no
effect upon the control circuit. Likewise, engagement
of the wiper arm 643 with the first contact of its re-
spective bank of contacts will have no effect upon the
circuit since the contact bar 690C is in the open position
interrupting the circuit between conductors 689 and 691.

At this time, it is emphasized that although the con-
tact bar of the limit switch 286, horizonal line 24X, is
in the open position, the relay 690 being a latching relay
is mechanically held in an energized condition. With
this condition existing, the associated contact bars 690A
and 690B are held in a closed position while the contact
bar 690C is held in the open position.

With the wiper arm 675 in engagement with the first
contact of its respective bank of contacts, a circuit is
completed through conductor 696, the now closed con-
tact bar 690B and conductors 697 and 683 and the now
closed contact bar 672A to energize the stepping switch
relay 672. As described hereinbefore, upward move-
ment of the contact bar 672A deenergizes the relay 672
and with the deenergization of the relay all four wiper
arms of the stepping switch 645 are advanced to the sec-
ond contact of their respective bank of contacts.

Engagement of the wiper arms 676 and 677 with their
respective second contacts has no effect on the circuit
since the contacts are open contacts. Likewise, engage-
ment of the wiper arm 643 with the second contact in
its respective bank of contacts produces no effect upon
the circuit since the contact bar 699C is in the open posi-
tion interrupting the circuit between conductors 698 and
692. The contact bar 699C is in the open position be-
cause the relay 699 is energized by a circuit completed
along horizontal line 8X from conductor 632 through
the conductor 703, the now closed contact bars 690A
and 702A to the relay 699 which is connected to the con-
ductor 671. The contact bar 702A completing the cir-
cuit to the relay 699 was moved to the closed position
by the prior energization of the relay 702 upon the clos-
ing of the contact bar 271U as the drum was advanced
to place the second tool in the machining cycle in the
tool change station. With the energization of the relay
699, its associated contact bar 699A bridges conductors
715 and 716 establishing a holding circuit for the relay
699. Thus, with the contact bar 699C in the open posi-
tion there is no effect on the control circuit at this time
with the wiper arm 643 engaging the second contact.

Engagement of the wiper arm 675 with the second
contact of its respective bank of contacts completes a
circuit from the wiper arm through conductors 711 and
717, through the now closed contact bar 699B of the
energized relay 699 and conductors 718, 697 and 683
to energize the stepping switch relay 672. Upon the
deenergization of the relay 672 by the upward movement
of its contact bar 672A the four wiper arms of the step-
ping switch 645 are advanced to the third contact of
their respective banks of contacts. With each of the
wiper arms 675, 643, 676 and 677 respectively engaging
the third contact in their bank of contacts, circuits are
established as described hereinbefore with regard to the
tool change cycle transferring the first tool in the machining cycle from the tool storage drum 32 to the spindle 41. Thus, the wiper arm 643 completes a circuit for energizing the relay 640 and the wiper arm 676 completes a circuit for energizing the relay 723. Likewise, the wiper arm 677 completes a circuit for energizing the relay 732 effecting clockwise rotation of the carrier 40.

Upon the carrier 40 rotating to a vertical position as illustrated in FIG. 1, the limit switch 298 is actuated removing its associated contact bar 298L to its closed position energizing the relay 738 which in turn completes a circuit, in horizontal line 37X, for energizing the stepping switch relay 672. Upon the deenergization of the stepping switch 672, as described hereinbefore, the four wiper arms of the stepping switch 645 are advanced to the fourth contact in their respective bank of contacts.

From the above description it will be apparent that the circuits established through the first and second contacts engaged by the wiper arm 643 are energizable only during the tool change cycle for transferring the first tool in a machining cycle from the drum 32 to the spindle 41. During transfer of the second and subsequent tools the circuits from these contacts are maintained interrupted by the open contact bars 690C and 699C.

Since the circuit for the remainder of the cycle for transferring the second tool functions identically as described hereinbefore with reference to transferring the first tool from the tool storage drum 32 to the spindle 41 as the wiper arms successively advance to the ninth contact in their respective banks of contacts, it is deemed unnecessary to repeat the description of the operation of the circuit. However, it is emphasized that the various circuit conditions will be repeated for each successive interchange of tools between the drum 32 and the spindle 41 during this particular machining cycle. Thus, the operation of the circuit for transferring the third tool in the machining cycle is identical with that for the second tool. Likewise, the circuit functions the same for the transfer of the fourth tool. It will be noted that upon the transfer of the last tool in the machining cycle from the spindle 41 to the tool support 33 in the tool storage drum 32, the machining cycle is completed.

At this point, it will be apparent that the machining cyce is actually completed prior to the transfer of the last tool in the cycle from the spindle 41 to the tool storage drum 32. In this respect, it is not really necessary to transfer the last tool in the cycle to the tool storage drum prior to removing all the tools from the tool storage drum and inserting different tools for a new machining cycle. It will be apparent that the last tool in the machining cycle could be removed manually from the spindle 41 releasing the collet by direct operating switching means (not shown).

Assume now that the prior set of tools used in the machining cycle has been removed from the tool storage drum 32 and that a completely different set of tools has been inserted in the drum for a new and different machining cycle. Likewise, in this new machining cycle as in the prior machining cycle, the first tool in the cycle is provided with an extended code identified tool holder body so as to be identified by actuating the limit switch 286, in horizontal line 24X, FIG. 18, and also shown in FIG. 3. Before initiating a new machining cycle by depressing the push button switch 653, horizontal line 29X, it is necessary to depress a drum reset push button switch 790 in horizontal line 23X. Depressing the switch 790 completes a circuit from the conductor 632 through the contact bar of the switch 790 to an unlatching relay coil 791, and a conductor 792 to the conductor 671. Energization of the unlatching relay coil 791 deactuates the relay 690, moving its associated contact bars 690A and 690B to the normally open position and the contact bar 690C to the closed position. With the relay 690 deactuated and deenergized, the limit switch 286 is now conditioned for identifying the first tool in the machining cycle as it approaches the tool change station 38. As described hereinbefore, actuation of the limit switch 286 by the first tool in the machining cycle, moves its contact bar to a closed position horizontal line 24X, completing a circuit for reenergizing the relay 690. Upon the deactuation of limit switch 286 the relay 690 will remain in an actuated or energized condition since it is retained in this energized condition mechanically. With the relay in an actuated or energized condition, the contact bar 690A is in the closed position conditioning a circuit for subsequently energizing the relay 699. The contact bar 690C is moved to the open position interrupting the circuit between conductors 689 and 691 to prevent clockwise rotation of the drum when the wiper arm 643 is an engagement with the first contact of its bank of contacts in subsequent tool change cycles i.e., when changing the second tool, etc. Thus, the first as well as the second contact engaged by the wiper arm 643 are open contacts after the first tool in the machining cycle actuates the limit switch 286 indicating it is approximately in the tool change station.

The contact bar 690B is in the closed position due to the actuation of the relay 690 bridging conductors 696 and 697 completing a circuit to energize the stepping switch relay 672 to advance all four wiper arms of the stepping switch 645 to the second contact of their respective banks of contacts. Therefore, it will be apparent that the reset switch 790 must be depressed either at the completion of a machining cycle or prior to initiating a new machining cycle which is initiated by depressing the switch 653, line 29X.

The electrical control circuit for controlling the operation of the modification of the original embodiment shown in FIGS. 13, 14 and 15 is identical with that shown in FIG. 18 and described above.

In FIG. 19, there is represented a modification of the invention in which the tool change carrier 40 is operatively disposed to effect an interchange of tools between the tool spindle 45 and a single storage socket.

As hereinbefore explained, the tool spindle 45 is rotatably journalled toward the upper portion of the vertically upstanding column 26. Although not shown in FIG. 19 the tool spindle 45 there represented is provided with an automatic tool clamping collet 194, together with the associated control apparatus represented in FIG. 2. Common reference numerals have been applied to identify identical parts hereinbefore described, and shown in the other drawings. Thus, the column structure 26 of FIG. 19 is identical to the column structure 26 represented in fragmentary form in FIGS. 1 and 13. It will be apparent therefore, that the conical type tool drum 32 of FIG. 1, o the tilting tool type storage drum 501 of FIG. 13, can be applied with equal advantage to a tool changer frame structure for application to the vertical column of a "knee type" milling machine.

Referring again to FIG. 19, the tool change carrier 40 is operatively carried by a modified hollow frame structure 28A for properly coordinated rotatable and axial movement relative to positive stops 47 and 49. The frame 28A is removably mounted on top of the column 26 in the same manner as the frame 28, being secured thereto by the bolts 31 as illustrated in FIG. 1. A movable stop 49 is likewise movably carried by the frame structure 28A in a manner to coact with the carrier 40 as both a positive stop and a movable guide member. The tool change carrier 40 is operatively disposed relative to the tool receiving spindle 45 and a single stationary tool receiving storage socket 806 provided in the upper portion of the hollow frame structure 28. The stationary storage socket 806 is positioned in parallel spaced relationship to the tool receiving spindle 45 journalled in the upper portion of the machine column 26. Actually, the single storage socket 806 is adapted to support a tool in a position identical to the tool change station 38 described in connection with the indexable tool storage drums represented in FIGS. 1 and 13.

In operating a machine incorporating the modification shown in FIG. 19, a tool would be manually withdrawn from the single socket 806 and replaced with the next tool required for the machine program. The manual loading of a tool into the single storage socket 806 is performed during the interval a tool secured within the spindle 45 is being operated to perform a machining operation. Thus, at the completion of a machining operation by one tool, the next required tool is positioned in the stationary storage socket 806 in readiness for a tool change cycle.

With a pair of tools respectively mounted in the storage socket 806 and the tool spindle 45, the tool change carrier is operated to effect an interchange of tools therebetween. The control mechanism and mode of operation of the carrier 40 in FIG. 19 is identical to that hereinbefore described in considerable detail with reference to the other drawings. Further, since no preliminary positioning or indexing movement is necessary, the control circuit is considerably simplified. In this connection, however, the control circuit fully described in connection with the schematic diagram shown in FIG. 18 is deemed adequate to control the simplified modification of the invention shown in FIG. 19.

From the foregoing detailed description of the illustrative embodiments set forth herein to exemplify the present invention, it will be apparent that there has been provided an improved tool change mechanism in combination with novel tool storage means.

Although the illustrative embodiments of the invention have been described in considerable detail for the purpose of disclosing a practical operative structure whereby the invention may be practiced advantageously, it is to be understood that the particular apparatus described is intended to be illustrative only, and that various novel characteristics of the invention may be incorporated in other structural forms without departing from the spirit and scope of the invention as defined in the subjoined claims.

The principles of this invention having now been fully explained in connection with the foregoing description, we hereby claim as our invention:

1. In a machine tool;
a frame;
a tool spindle rotatably mounted in said frame and adapted to receive a tool;
a power driven rotatably indexable tool storage drum mounted on said frame in operative proximity to said spindle and adapted to carry a plurality of tools for selective transfer to said spindle,
said storage drum mounted on said frame in a manner that its axis of rotation is at an angle of 45° from a horizontal plane,
said storage drum adapted to store tools in a conical array so that the longitudinal axis of each tool intersects the rotational axis of said drum;
a tool changer member having a pair of tool gripping recesses and being movably carried in bodily spaced relationship relative to said drum and said spindle,
said changer member being axially movable as well as rotatably movable and being selectively operable to interchange tools between said spindle and said storage drum;
mechanical locks carried in opposite extending portions of said changer member,
each lock operable to securely lock a tool in its respective tool gripping recess during rotary as well as axial movement of said changer member;
a rigid stop member fixedly secured to said frame in position to be engaged by said changer member when said changer member is in an axially retracted position and rotated to fully engage the tools to be interchanged;
an axially movable stop member carried by said frame and spring biased in one direction to a predetermined position;
a power actuator operative to move said stop member axially in the opposite direction to a predetermined position,
said movable stop member being positionable to be engaged by said changer member upon rotary movement thereof to a tool inserting position when said changer member is in an axially extended position;
and power means including control means operative to effect movement of said tool changer member and coordinated operation of said power actuator to selectively interchange tools between said storage drum and said spindle.

2. In a machine tool, tool receiving storage means and spaced apart tool receiving operating means comprising a rotatable power drive spindle;
a power driven bodily movable tool engaging carrier selectively operable to bodily transfer a tool from one of said tool receiving means to the other of said tool receiving means; and,
a movable stop engageable with said carrier during its operation to transfer a tool from one to the other of said tool receiving means, said movable stop being operable to terminate movement of said carrier in one direction and to guide movement of said carrier in another direction.

3. In a machine tool;
a rotatable tool receiving socket;
a power driven rotatable tool spindle adapted to support said socket for moving a tool carried therein to perform a machining operation;
a tool receiving storage socket carried in parallel spaced relationship to said spindle;
a tool carrier mounted for axial and rotatable movement along a common axis in parallel relationship to said spindle, said tool carrier being provided with a tool receiving recess;
first power drive means connected to rotate said carrier in retracted position for engaging a tool carried by one of said sockets, to rotate said carrier in the same direction in extended position for moving a withdrawn tool into axial alignment with the other of said sockets, and for reversibly rotating said carrier in retracted position to release the reinserted tool;
second power drive means connected to effect axial movement of said carrier from a retracted to extended position for withdrawing a tool in preparation for an interchange and for reversibly moving said carrier from extended to retracted position for reinserting the interchanged tool into the other of said sockets;
a positive stop positioned to control the positioning movement of said carrier in a retracted position;
a movable stop normally carried in a retracted position and connected to be moved by said second power drive means from a retracted to an extended position for controlling rotatable movement of said carrier in its axially extended position; and,
sequence control means connected to effect coordinated activation of said power drive means for operating said carrier to effect bodily transfer movement of a tool from one of said sockets to the other of said sockets.

4. In combination with a machine tool having a power driven rotatable tool spindle and a column upon which it is mounted;
a tool storage and tool change mechanism comprising a hollow supporting frame secured to said column;
tool storage means including a tool storage socket carried by said frame adapted to support a preselected tool in spaced parallelism to said tool spindle;
a tool change carrier supported by said frame for axial and rotatable movement relative to said spindle and said storage socket;

power drive means including control means carried by said frame connected to effect coordinated movements of said carrier for effecting an interchange of tools between said storage socket and said tool spindle; and, a movable stop carried by said frame in a normally retracted position and connected to be moved by said power drive means to an extended position for positively controlling the rotatable movement of said carrier in its extended position, said movable stop being disposed to guide said carrier for axial tool inserting movement.

5. In a machine tool;

a pair of spaced apart tool receiving sockets;

a power driven tool spindle adapted to support one of said sockets;

a tool engaging carrier operatively movable to perform a tool change cycle for effecting a bodily interchange of tools carried by said sockets;

a movable stop carried for movement from an inactive retracted position to an operative extended position for guidably engaging said carrier; and, power drive means including control means selectively operative to move said carrier and said movable stop for performing an interchange of tools between said sockets, said power drive means being operative to dynamically retain said carrier in guidable engagement with said movable stop during a predetermined portion of a tool interchange cycle.

6. In a machine tool;

tool receiving storage means;

spacing apart tool receiving operating means comprising a rotatable tool spindle;

a tool engaging carrier extensibly movable from retracted position for withdrawing a tool from one of said receiving means, said carrier being movable in a plane perpendicular to its path of extensible movement in both retracted and extended positions, said carrier being reversibly movable from extended position to retracted position for inserting a tool in the other of said receiving means;

a plurality of stop means operatively positioned to control the extent of lateral movement of said carrier in both retracted and extended positions predetermined ones of said stop means controlling the extent of lateral movement by obstructing further movement when engaged by said carrier; and, power drive means connected to effect selective lateral and extensible movements of said carrier for performing a cycle of movements to bodily transfer a tool from one of said receiving means to the other of said receiving means, said power drive means being connected to dynamically retain said carrier in abutting engagement with predetermined ones of said stop means.

7. In a machine tool;

a power driven rotatable tool spindle including tool receiving means;

an indexable tool storage drum journalled to rotate about an axis angularly disposed with respect to the axis of said spindle, said drum being provided with a conical array of tool receiving sockets, each of the sockets having an angular relationship to the axis of said drum that is identical to the angular relationship between the respective axes of said drum and said spindle;

power driven index control means connected to selectively rotate said drum for indexably positioning one of the tool receiving sockets in parallel tool changing relationship to said spindle; and, a power driven tool change mechanism operative to effect a bodily interchange of tools respectively carried by said spindle receiving means and an indexably positioned socket in said storage drum.

8. In a machine tool;

a frame;

a rotatable tool spindle supported by said frame and provided with first tool receiving means;

an indexable storage member provided with predeterminately spaced apart tool receiving means;

a tool engaging carrier movably supported by said frame to effect a bodily interchange of a pair of tools mounted in the receiving means respectively provided in said tool spindle and said storage member;

lock means movably associated with said carrier and operative to releasably lock tools therein;

stationary cam means mounted on said frame to lie in the path of movement of said carrier to effect selective operation of said lock means during movable operation of said carrier; and, power drive means including control means connected to effect movement of said carrier for effecting an interchange of tools.

9. In a tool change mechanism including a frame;

a carrier supported by said frame for axial and rotatable movement, said carrier provided with tool carrying means;

a spindle carried by said frame in bodily spaced relationship to said carrier;

stop means supported by said frame and selectively movable relative to said carrier into a path of movement described by the rotation of said carrier to interrupt rotation of said carrier and position one of the tool carrying means of said carrier in parallel alignment with the longitudinal axis of said spindle;

and power means connected to move said carrier including control means to selectively move said stop means.

10. In a tool transfer mechanism;

a pair of spaced apart tool receiving means;

a power driven rotatable tool spindle adapted to support one of said tool receiving means;

a tool carrier including first power drive means and being operable to interchange tools between said receiving means;

movable stop means responsive to activation of said first power drive means;

second power drive means connected to move said carrier in a direction different than that effected by said first power drive means; and, third power drive means connected to effect additional movement of said stop means to control movement of said carrier when it is being moved by said second power drive means.

11. In a tool changer mechanism;

a frame;

a power driven spindle rotatably mounted in said frame;

an indexable tool storage drum adapted to releasably carry a plurality of tools and operative to position a selected tool in spaced relationship to said spindle;

a power driven tool change member selectively movable in three planes and carried in bodily spaced relationship relative to said spindle and said drum for operation to interchange a selected tool in said drum with a tool in said spindle;

a stationary member mounted on said frame in position to limit movement of said tool change member in one plane of movement;

an adjustable member carried by said frame to limit movement of said tool change member in a second plane of movement;

and power driven control means operative to move said tool change member for interchanging tools between said spindle and said drum.

12. In a machine tool;

an indexable tool storage matrix carried for move ment relative to an operating station and provided with a plurality of tool receiving storage sockets;

a coded tool carried in one of the matrix sockets;

a plurality of non-coded tools removably carried in other of the matrix sockets in predetermined sequential relationship to said coded tool, all of said tools comprising a code identified group of tools required to be selectively and sequentially presented to the operating station during one machine program;

power drive means connected to effect movement of said matrix relative to the operating station;

code responsive means carried in position to be actuated by said coded tool durnig movement of said matrix;

index control means actuated by operation of said code responsive means to stop said power drive means and said matrix to position the coded tool in the operating station, said index control means; including means conditioned by said code responsive means to control movement of said matrix for advancement in successive single steps upon subsequent reactivation of said power drive means during the same program, hereby the code identified tool and the non-coded tools re presented to the operating station in predetermined equence.

13. In a machine tool;

a movable tool storage matrix provided with a plurality of spaced apart tool receiving sockets;

a first coded tool and a plurality of non-coded tools removably carried in predetermined sequential relationship in the socket provided in said matrix;

power drive means connected to move said matrix for positioning a preselected tool at a tool change station;

selectively actuatable index control means connected to control said power drive means;

code responsive means actuated by said coded tool during movement of said matrix and being operative to render said index control means actuatable to control said power drive means to stop the movement of said matrix, said index control means including means, upon selection of the coded tool, to thereafter index said matrix step by step to sequentially present the non-coded tools as needed;

a tool receiving spindle carried in operatively spaced relationship to the tool change station;

and a power driven tool change mechanism operative to effect an interchange of tools between said spindle and the matrix storage socket positioned at the tool change station.

14. In a machine;

a storage member provided with a plurality of tool receiving storage sockets;

a plurality of tools removably carried by said storage sockets in predetermined sequential relationship;

a code structure associated with one of said tools for indicating the position of said associated tool in said member;

code responsive means carried in proximity to said storage member in position to be actuated by said code structure;

a selectively energizable power drive connected to initially effect relative bodily movement between said storage member and said code responsive means;

control means connected to deactivate said power drive upon activation of said code responsive means for stopping movement between said member and said responsive means to position said tool associated with said code structure in a predetermined operating station;

and sequence control means conditioned by activation of said code responsive means for effecting subsequent intermittent activation of said power drive for effecting selective indexable movement between said storage member and said code responsive means for successively positioning said sequentially arranged non-coded tools in the predetermined position vacated by said coded tool.

15. In a machine tool;

a rotatable spindle;

a storage member providing at least one tool in position for placement in the spindle;

a transfer mechanism including a tool change member mounted to rotate to grip the positioned tool, to move outwardly to an extended position to withdraw the gripped tool from the storage member, to rotate to align the gripped tool with the spindle and to move inwardly to insert the gripped tool into the spindle;

a stop movable outwardly into the path of the rotation of the change member as it is rotated in extended position to form an abutment to obstruct and stop the further rotation thereof when the gripped tool is in alignment with the spindle and to maintain such alignment as said change member moves inwardly; and, power means operable to cause the rotations and movements of said change member and the movements of said stop.

16. A machine tool, as set forth in claim 15, wherein said storage member includes a drum providing a conical array of stored tool sockets indexable on an axis at an acute angle to the axis of said spindle; and, means for indexing said drum to present tools in position for placement in said spindle.

17. A machine tool, as set forth in claim 16, wherein said indexing means includes a code responsive means for locating a coded tool, which leads a sequential arrangement of non-coded tools to stop the indexing to locate the coded tool in position for placement in the spindle; and, step by step indexing means for sequentially stopping the non-coded tools at such position.

18. A machine tool including a spindle rotatable on a horizontal axis;

a storage drum providing a plurality of tools, indexable on an axis acute to said spindle axis;

means to index said drum and to individually present tools at a tool change location with the presented tool axis parallel to the spindle axis, said axes being disposed in vertical alignment for a tool interchange; and, a transfer mechanism located between the drum and spindle and operable to interchange presented tools with said spindle.

19. A tool supply attachment unit for securement to the top of a spindle support of a machine tool, said unit including a unitary framework having a base for attachment to a machine tool;

a drum provided with means for holding a plurality of tools and indexable on an axis mounted in said framework at an acute angle to said base;

means mounted in said base and operating said drum;

means for holding tools to individually present tools at a tool change location with the presented tool axis parallel to the base, said axis being in vertical alignment with the axis about which said drum is indexable;

a transfer mechanism located between said drum and said base and operable to interchange presented tools with a spindle when said unit is mounted on a machine tool; and, power means contained in said framework for driving said drum operating means and said transfer mechanism.

20. In a machine tool;

a rotatable spindle having an axis of rotation disposed in a horizontal plane; and, a rotatable storage drum providing a conical array of tools, which rotate with said drum on an axis positioned at an acute angle to the spindle axis, the angle of said drum axis and the conical angle of said conical array of tools being so related that a tool positioned at a tool interchange location will have its axis parallel to the horizontal axis about which said spindle rotates.

21. In a machine tool;
a base;
a column extending upwardly from said base and presenting a front face;
a knee carried by said column for movement in a vertical path of travel and extending outwardly from the front face of said column;
a work supporting table mounted on said knee for horizontal movement in two mutually transverse paths;
a spindle journaled in said column and adapted to rotate a tool carried by it above said work supporting table for operating on a workpiece carried by said table;
a tool change member movably supported by the front face of said column above said spindle for extracting and removing a previously used tool from said spindle and transferring a new tool to said spindle for the performance of a succeeding machining operation; and a movable stop carried for movement from an inactive retracted position to an operative extended position for guidably engaging said tool change member.

22. In a machine tool;
an upwardly extending column;
a work supporting table movably supported by said column;
a spindle journaled in said column for rotation about a fixed axis, said spindle being adapted to receive diverse tools for operation on a workpiece carried by said table;
a tool change arm journaled in said column for rotation about a fixed axis;
tool holding means on said arm for securing a tool thereto so that the rotary movement of said arm functions to move a previously used tool away from said spindle and moves a new tool to said spindle for the performance of a succeeding work operation and a movable stop carried by said column for movement from an inactive position to an operative position for engagement by said tool change arm to stop the rotary movement of said tool change arm in a desired position during a tool change operation.

23. In a machine tool;
a rotatable spindle;
an indexable storage drum adapted to hold a plurality of diverse tools arranged in a working sequence for interchange with said spindle;
means for rotating said drum;
means for stopping the rotation of said drum in response to the movement of the leading tool of the sequence into an interchange location;
indexing means for indexing said drum to its index positions successively for successively moving the remaining tools into said interchange location in the same order that they are disposed in said drum; and
means for interchanging tools between said location and said spindle.

References Cited by the Examiner

UNITED STATES PATENTS

| | | | |
|---|---|---|---|
| 2,542,357 | 2/1951 | Reed | 222— |
| 3,052,011 | 9/1962 | Brainard | 29—2 |
| 3,073,024 | 1/1963 | Hutchens | 29—56 |

RICHARD H. EANES, Jr., *Primary Examiner.*

Disclaimer 3,218,706.—*Frank Zankl* and *Earl R. Lohneis*, Milwaukee, Wis. MACHINE TOOL WITH TOOL CHANGER. Patent dated Nov. 23, 1965. Disclaimer filed June 26, 1972, by the assignee, *Kearney & Trecker Corporation*.

Hereby enters this disclaimer to all claims of said patent.

[*Official Gazette February 19, 1974.*]